(12) United States Patent
Fukuhara

(10) Patent No.: US 10,898,958 B2
(45) Date of Patent: Jan. 26, 2021

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Yousuke Fukuhara, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/329,239

(22) PCT Filed: Aug. 28, 2017

(86) PCT No.: PCT/JP2017/030669
§ 371 (c)(1),
(2) Date: Feb. 28, 2019

(87) PCT Pub. No.: WO2018/043373
PCT Pub. Date: Mar. 8, 2018

(65) Prior Publication Data
US 2019/0247931 A1     Aug. 15, 2019

(30) Foreign Application Priority Data

Aug. 29, 2016 (JP) .................... 2016-166824

(51) Int. Cl.
 *B23B 27/16* (2006.01)
 *B23B 27/14* (2006.01)
 *B23B 27/22* (2006.01)

(52) U.S. Cl.
CPC ............ *B23B 27/143* (2013.01); *B23B 27/16* (2013.01); *B23B 27/22* (2013.01); *B23B 2200/049* (2013.01); *B23B 2200/0447* (2013.01)

(58) Field of Classification Search
CPC ........ B23B 27/16; B23B 27/143; B23B 27/22; B23B 2200/0447; B23B 2200/049;
(Continued)

(56) References Cited

U.S. PATENT DOCUMENTS 3,097,417 A * 7/1963 Hill ............... B23B 27/1618
                                              407/104
3,975,809 A * 8/1976 Sorice ............... B23C 5/205
                                              407/114
(Continued)

FOREIGN PATENT DOCUMENTS

| JP | S61-58008 U    | 4/1986  |
|----|----------------|---------|
| JP | H0615517 A     | 1/1994  |
| JP | 20080284666 A  | 11/2008 |

*Primary Examiner* — Eric A. Gates
*Assistant Examiner* — Paul M Janeski
(74) *Attorney, Agent, or Firm* — Viering, Jentschura & Partner MBB

(57) ABSTRACT

A cutting insert may include an upper surface, a side surface, and a cutting edge. The upper surface may include a first breaker portion and a second breaker portion. The first breaker portion may include a first surface inclined downward and a second surface inclined upward. The second breaker portion may be inclined upward as the second breaker portion extends away from the first breaker portion. An inclination angle of the first surface may be constant along the first side portion. A length of the first surface may be greater at a second end portion than at a first end portion. An intersection portion of the first breaker portion and the second breaker portion may be orthogonal to the first side portion, or inclined away from the first corner portion as the intersection portion extends away from the first side portion.

16 Claims, 21 Drawing Sheets

(58) Field of Classification Search
CPC .......... B23B 2200/32; B23B 2200/325; B23B 2200/323; B23B 27/1618; B23C 5/205; Y10T 407/235; Y10T 407/245
See application file for complete search history.

(56) References Cited

U.S. PATENT DOCUMENTS 4,486,127 A * 12/1984 Eckle .................... B23B 27/141
407/114
4,681,487 A * 7/1987 Pettersson ............. B23B 27/143
407/113

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2017/030669 filed on Aug. 28, 2017, which claims priority to Japanese Application No. 2016-166824 filed on Aug. 29, 2016, which are entirely incorporated herein by reference.

TECHNICAL FIELD

The present disclosure relates to a cutting insert, a cutting tool, and a method for manufacturing a machined product.

BACKGROUND ART

A throw away cutting tool including a cutting insert mounted on a holder has been used as a cutting tool used for cut processing and the like. The cutting insert used in such a cutting tool may include an upper surface having a polygonal shape, a side surface, and a cutting edge located at an intersecting line portion of the upper surface and the side surface. A workpiece may be cut by bringing this cutting edge into contact with the workpiece.

PTL 1 (PTL 1: JP 61-58008 U-A) discusses a cutting insert used in such a cutting tool. The cutting insert discussed in PTL 1 may include a tip breaker groove formed along a cutting edge ridge. In the tip breaker groove, a land, an inclined surface having a large rake angle, a step surface, and a raised surface may be continuously formed, in order, from a side of the cutting edge ridge.

In recent years, a cutting insert that exhibits excellent cutting capabilities under more severe cutting conditions has been required. Particularly, cut processing in which a great amount of cutting is implemented is frequently employed in order to improve cutting efficiency. When the cutting insert described in PTL 1 is employed in cut processing in which a great amount of cutting is implemented, stable chip processing may not be obtained and machined surface accuracy may be decreased. Thus, there has been a requirement to provide a cutting insert that exhibits excellent chip processing performance and provides excellent machined surface accuracy in cut processing in which a great amount of cutting is implemented, i.e., so-called deep cutting processing.

SUMMARY

A cutting insert in a non-limiting aspect of the present disclosure may include an upper surface including a first side portion, a second side portion, and a first corner portion located between the first side portion and the second side portion, a lower surface located opposite to the upper surface, a side surface located between the upper surface and the lower surface, and a cutting edge located at a portion, which corresponds to the first corner portion and the first side portion, on an intersecting line portion of the upper surface and the side surface. The upper surface may include a first breaker portion extending along the first side portion from the first corner portion, and may include a first end portion located on the first corner portion and a second end portion located farther from the first corner portion than the first end portion, and a second breaker portion that is connected to the second end portion of the first breaker portion and extends along the first side portion away from the first breaker portion. The first breaker portion may include a first surface that extends along the first side portion and is inclined downward as the first surface extends away from the first side portion, and a second surface that extends along the first surface and is inclined upward as the second surface extends away from the first surface. The second breaker portion may be inclined upward as the second breaker portion extends away from the first breaker portion. An inclination angle of the first surface may be constant along the first side portion. A length of the first surface in a direction perpendicular to the first side portion may be greater at the second end portion than at the first end portion in a top view. An intersection portion of the second end portion of the first breaker portion and the second breaker portion may be orthogonal to the first side portion, or inclined away from the first corner portion as the intersection portion extends away from the first side portion in a top view.

A cutting tool in a non-limiting aspect of the present disclosure may include the cutting insert according to the present disclosure described above, and a holder on which the cutting insert is mounted.

A method for manufacturing a machined product in a non-limiting aspect of the present disclosure may include rotating a workpiece, bringing the cutting edge of the cutting tool according to the present disclosure described above into contact with the workpiece that is rotating, and separating the cutting tool from the workpiece.

DETAILED DESCRIPTION

Cutting Insert

Figure 1:
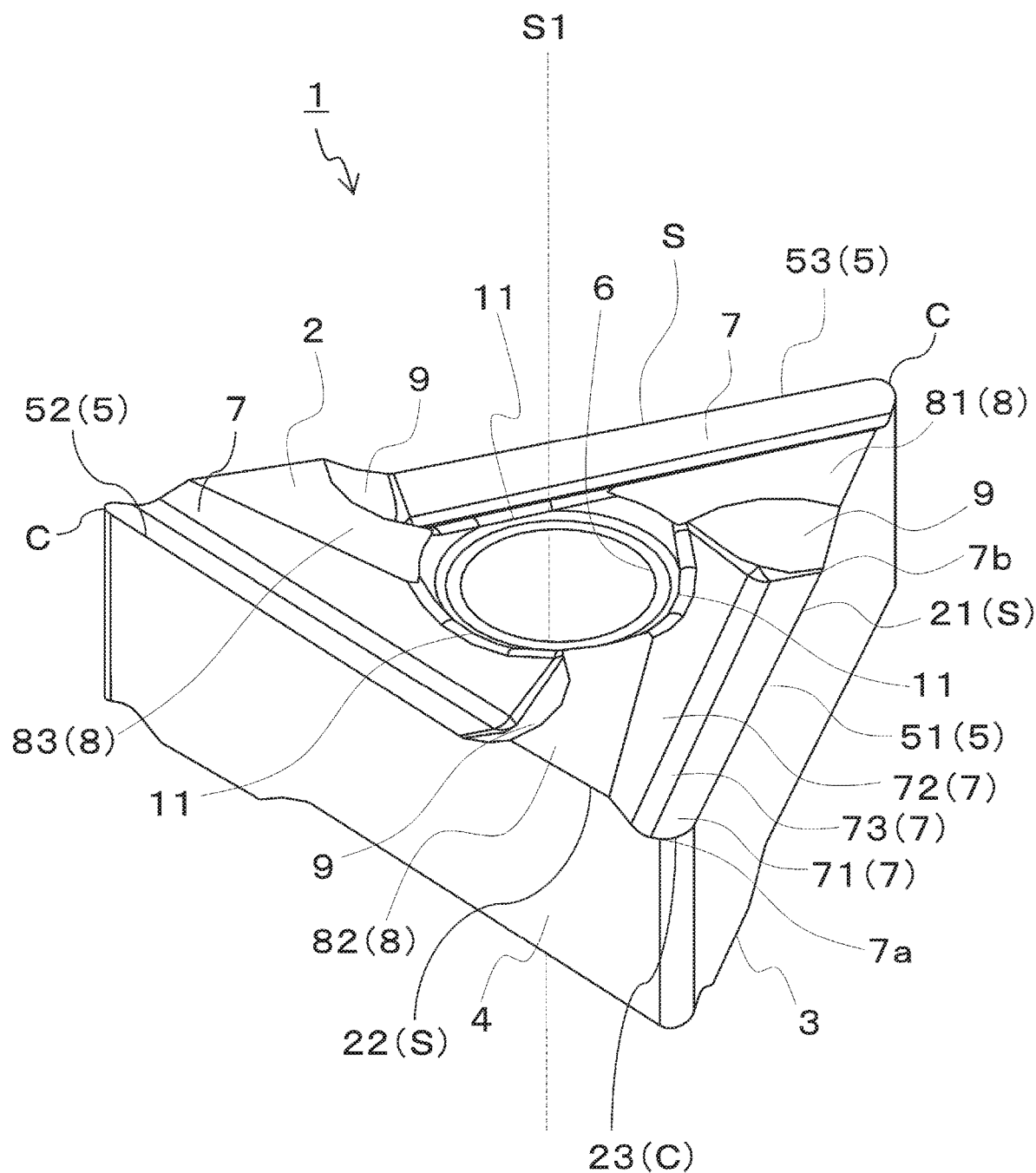
FIG. 1 is a perspective view illustrating a cutting insert according to a first non-limiting embodiment of the present disclosure.

A detailed description will be given below of a cutting insert (also simply referred to as "an insert" below) according to non-limiting embodiments of the present disclosure using the drawings. However, for ease of explanation, each of the drawings referenced below is simplified and illustrates only the main constituent members needed to describe various non-limiting aspects of the present disclosure. Accordingly, the cutting insert of the present disclosure may be provided with any constituent member which is not illustrated in the referenced drawings. Further, the dimensions of the members in the drawings do not faithfully represent the actual dimensions, dimension ratios, or the like of the constituent members. The above-described points are similarly applied to a cutting tool and a method for manufacturing a machined product described later.

First Non-Limiting Embodiment

Figure 2:
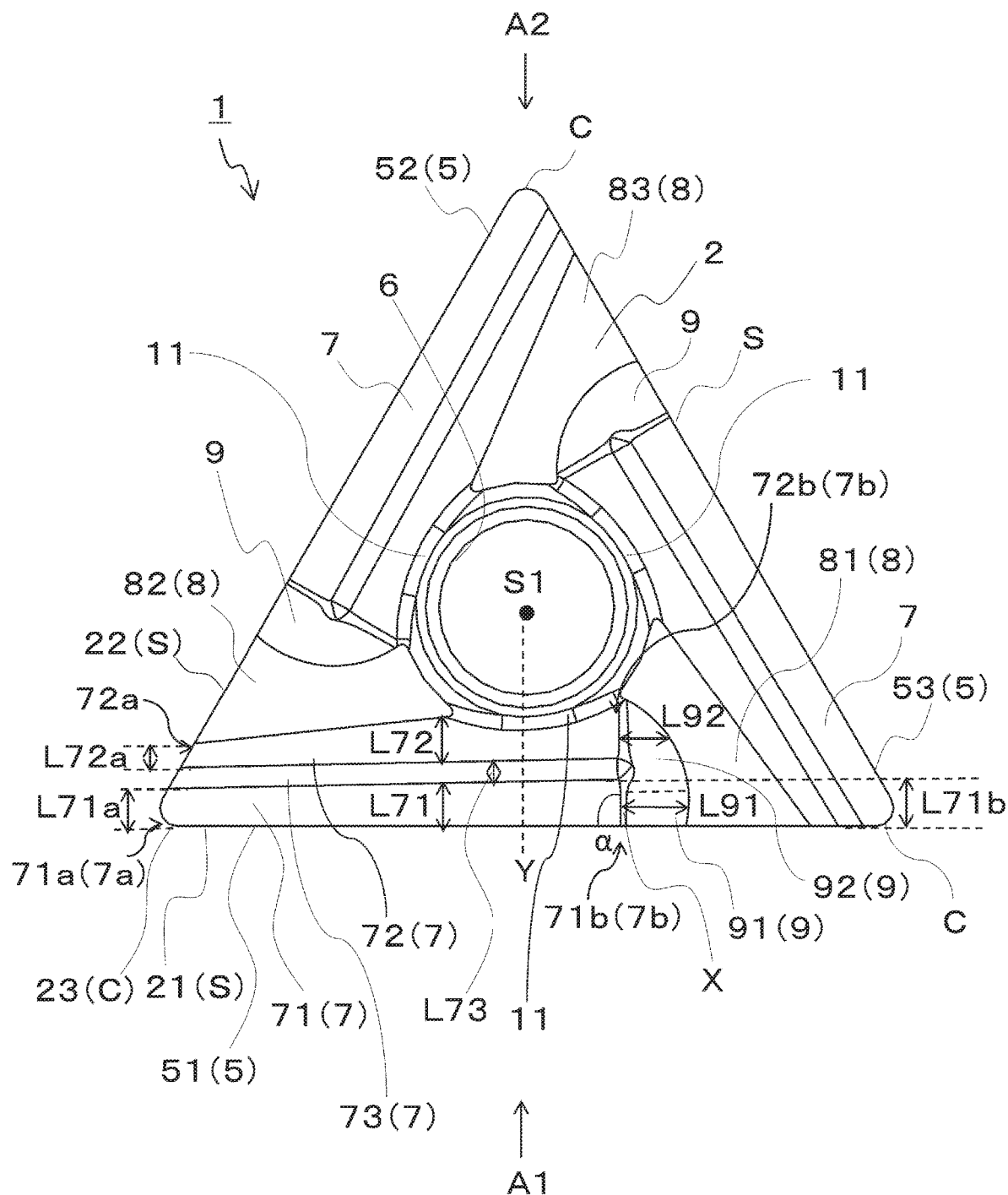
FIG. 2 is a top view of the cutting insert illustrated in FIG. 1.

FIGS. 1 to 7 are views illustrating an insert 1 according to a first non-limiting embodiment of the present disclosure. As illustrated in FIGS. 1 to 4, the insert 1 may include—an upper surface 2, a lower surface 3, a side surface 4, and a cutting edge 5 in the first non-limiting embodiment. The upper surface 2 may include—a first side portion 21, a second side portion 22, and a first corner portion 23. The lower surface 3 may be located opposite to the upper surface 2. The side surface 4 may be located between the upper surface 2 and the lower surface 3. The cutting edge 5 may be located at an intersecting line portion of the upper surface 2 and the side surface 4 and at an intersecting line portion of the lower surface 3 and the side surface 4. Moreover, the upper surface 2 may include—a first breaker portion 7 and a second breaker portion 9. Further, as illustrated in FIGS. 1 and 2, the insert 1 may include—a through hole 6 penetrating from the upper surface 2 to the lower surface 3. Note that, the upper surface 2 and the lower surface 3 are expressions for convenience' sake, and do not represent directions of up and down. For example, the upper surface 2 does not need to be a surface facing in an upward direction when the insert 1 is mounted on a holder 103 described later.

As illustrated in FIG. 2, a shape of the insert 1 in a plan view (top view) may be a substantially triangular shape, more specifically, a substantially equilateral triangular shape. In other words, the upper surface 2 of the insert 1 may include three corner portions C and three side portions S in the top view, and may be 120 degrees rotation-symmetrical with respect to a central axis S1 of the insert 1. Moreover, the upper surface 2 may include the first side portion 21, the second side portion 22, and the first corner portion 23. The first corner portion 23 may be located between the first side portion 21 and the second side portion 22. Accordingly, the first side portion 21 and the second side portion 22 may have the same shape in the first non-limiting embodiment.

Herein, the top view represents a state where the insert 1 is viewed to face the upper surface 2 unless otherwise indicated below. Also, the central axis S1 of the insert 1 herein is an axis penetrating from the upper surface 2 to the lower surface 3.

Note that, a shape of the upper surface 2 of the insert 1 is not limited to a substantially triangular shape, and may be a polygonal shape including at least the first side portion 21, the second side portion 22, and the first corner portion 23. Thus, the insert 1 may have a substantially polygonal plate shape such as a quadrilateral and a pentagon.

One side of the substantially equilateral triangular shape of the insert 1 in the top view may be, for example, 12 to 18 mm. Further, a distance from the top surface 2 to the lower surface 3 of the insert 1, namely, a thickness of the insert 1 may be, for example, 4 to 8 mm. Herein, the thickness represents a line segment, which is parallel to the central axis S1 of the insert 1, of a distance from a portion located at the highest part of the upper surface 2 to a portion located at the lowest part of the lower surface 3 in a side view. Also, the view from the side herein represents a state where the insert 1 is viewed to face the side surface 4 unless otherwise indicated below. Moreover, a vertical direction is a direction along the central axis S1 of the insert 1. Then, given that a direction from the inside of the insert 1 toward the upper surface 2 is positive and a direction from the inside of the insert 1 toward the lower surface 3 is negative, a positive side of the direction along the central axis S1 is an upward direction, and a negative side of the direction along the central axis S1 is a downward direction.

Figure 3:
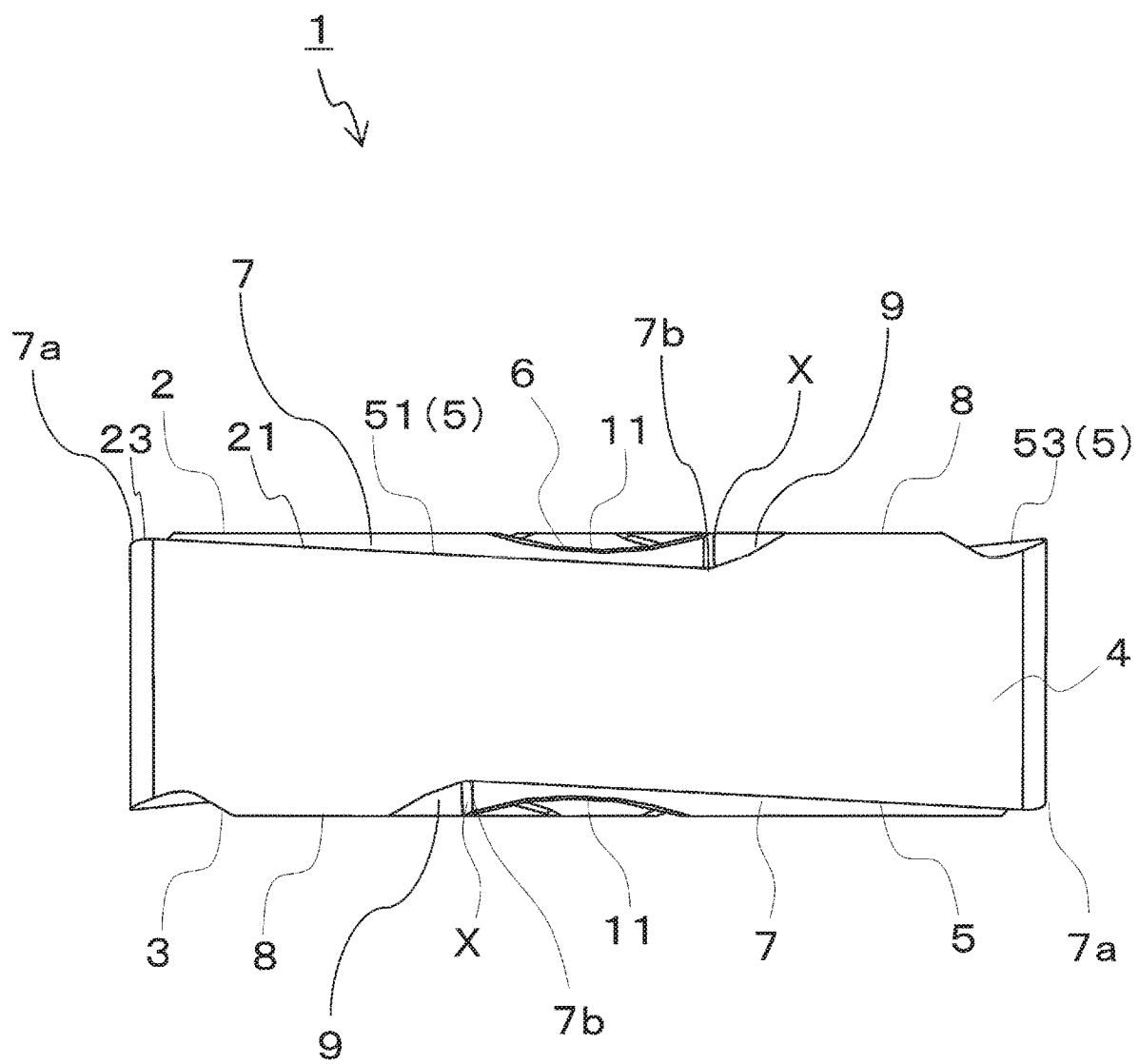
FIG. 3 is a side view from a direction A1 of the cutting insert illustrated in FIG. 2.
Figure 4:
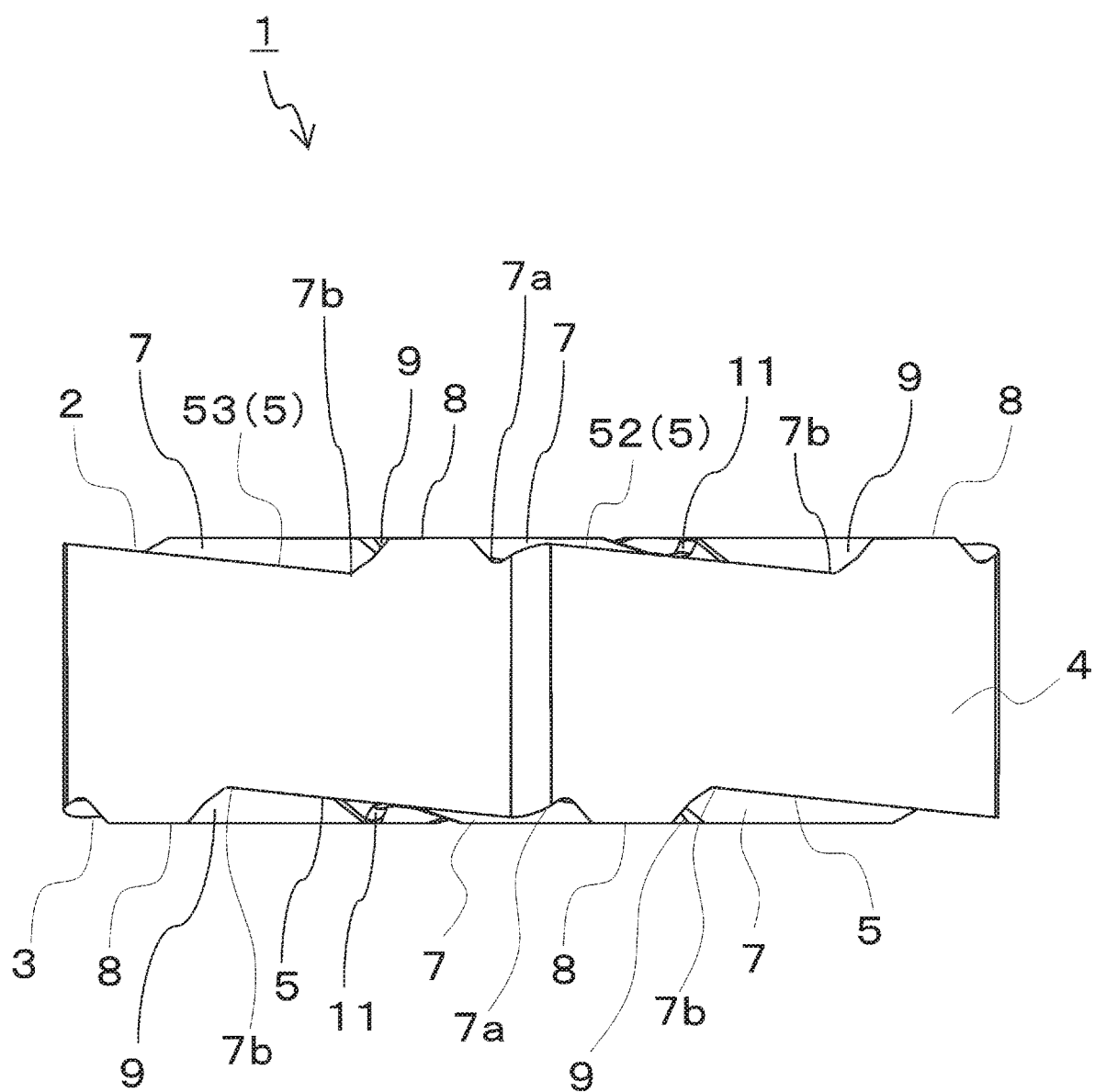
FIG. 4 is a side view from a direction A2 of the cutting insert illustrated in FIG. 2.

As illustrated in FIGS. 1, 3, and 4, the insert 1 may include the cutting edge 5 at the intersecting line portion of the lower surface 3 and the side surface 4, similarly to a side of the upper surface 2. When cut processing is performed by using the cutting edge 5 on a side of the lower surface 3, the upper surface 2 can be used as a seating face for the holder 103 described later. Therefore, each of the side of the upper surface 2 side and the lower surface 3 of the insert 1 in the first non-limiting embodiment can be used for cut processing, and thus the side of the lower surface 3 may be configured to have a shape in which a configuration on the side of the upper surface 2 is reversed in such a way that the insert 1 can be usable in a state of being turned over vertically. In other words, the insert 1 may be rotation-symmetrical with respect to a line, which is perpendicular to the paper surface of FIG. 3, as the center. Accordingly, the insert 1 in the first non-limiting embodiment can perform cut processing by using the corner portions C (corners C) at three places of each of the upper surface 2 and the lower surface 3, which are six places in total.

Note that, the upper surface 2 and the lower surface 3 have the same configuration in the insert 1 in the first non-limiting embodiment, but the configuration on the side of the lower surface 3 may be different from the configuration on the side of the upper surface 2. For example, the cutting edge 5 on the side of the upper surface 2 and the cutting edge 5 on the side of the lower surface 3 have the same configuration in the insert 1 in the first non-limiting embodiment, but the configuration of the cutting edge 5 on the side of the lower surface 3 may be not limited to this, and may be different from the configuration of the cutting edge 5 on the side of the upper surface 2. In other words, the insert 1 in the first non-limiting embodiment may include the cutting edge 5 at the intersecting line portion of the upper surface 2 and the side surface 4, and may not include the cutting edge 5 at the intersecting line portion of the lower surface 3 and the side surface 4.

Each constituent element of the insert 1 in the first non-limiting embodiment is successively described below in detail.

With Regard to Side Surface 4

As illustrated in FIGS. 1, 3, and 4, the side surface 4 may be located between the upper surface 2 and the lower surface 3, and may be connected to each of the upper surface 2 and the lower surface 3. At least a part of the side surface 4 may function as a binding face when the insert 1 is mounted on the holder 103, and may function as a so-called relief face for avoiding contact with a workpiece during cut processing. In the first non-limiting embodiment, the side surface 4 may be disposed perpendicularly to the upper surface 2 and the lower surface 3. In this way, the upper surface 2 and the lower surface 3 may have substantially the same shape so as to overlap each other in the plan view.

With Regard to Cutting Edge 5

The cutting edge 5 may be located at a portion, which corresponds to the first corner portion 23 and the first side portion 21, on the intersecting line portion of the upper surface 2 and the side surface 4. The cutting edge 5 may be used to cut a workpiece during cut processing. More specifically, the cutting edge 5 may be at least a part of a region that, among a region in which the upper surface 2 and the side surface 4 intersect each other, includes a portion corresponding to the first corner portion 23 and the first side portion 21. In the first non-limiting embodiment, as described above, the insert 1 can perform cut processing by using the corner portions C (corners C) at the three places on the side of the upper surface 2. In other words, as illustrated in FIGS. 1 and 2, the cutting edge 5 on the side of the upper surface 2 may be located to correspond to each of the three corner portions C and the three side portions S, i.e., includes three cutting edge portions 51, 52, and 53. Note that, as described above, the configuration of the cutting edge 5 is not limited to such a configuration, and the cutting edge 5 may include the cutting edge portion 51 corresponding to at least the first corner portion 23 and the first side portion 21.

Moreover, a portion which is at least a part of the intersecting line portion of the upper surface 2 and the side surface 4 and on which the cutting edge 5 is located may be subjected to a so-called honing process. The honing process can reduce a decrease in strength of the cutting edge 5. Examples of the honing process include R honing and the like.

With Regard to Through Hole 6

Figure 16:
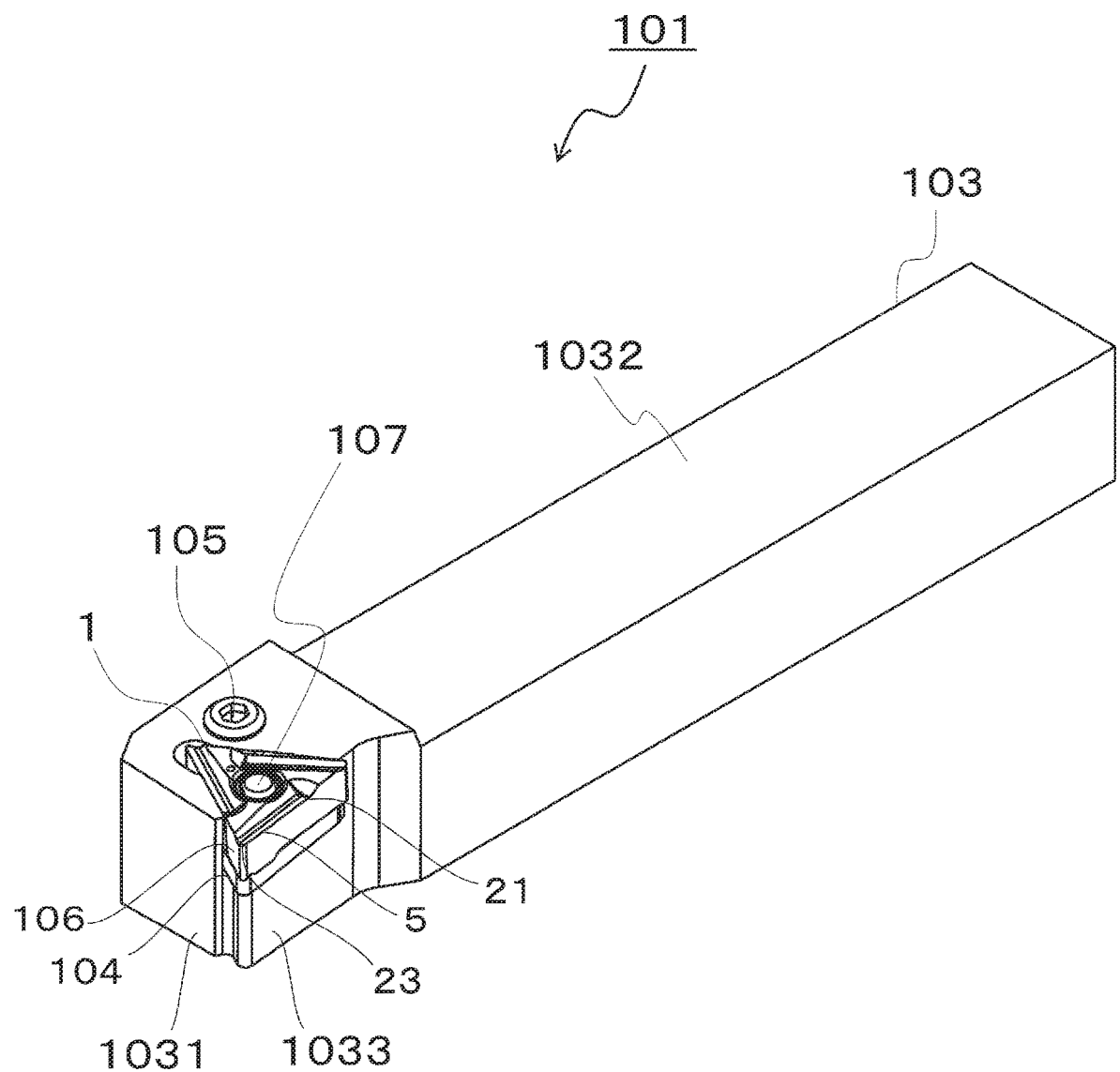
FIG. 16 is a perspective view illustrating a cutting tool according to a non-limiting aspect of the present disclosure.

The through hole 6 may be a hole through which a fastening screw, a mounting screw, or the like is inserted when the insert 1 is mounted on the holder 103. In the first non-limiting embodiment, as described later by using FIG. 16, the insert 1 may be fixed to the holder 103 of a cutting tool 101 by a clamp member 107. Therefore, a tip portion of the clamp member 107 for clamp fixing may be inserted in the through hole 6. Then, a screw 105 that fixes the clamp member 107 may be screwed to the holder 103, whereby the insert 1 is pressed against the holder 103 by the tip portion of the clamp member 107. In this way, the insert 1 may be fixed to the holder 103. As a method for fixing the insert 1 to the holder 103, another method such as fixing with a screw may be adopted in place of a method using such a clamp structure. Note that, the insert 1 may not include the through hole 6, depending on a method for fixing the insert 1 to the holder 103.

In the first non-limiting embodiment, as illustrated in FIG. 2, the through hole 6 may be located at a central portion of the upper surface 2. More specifically, the through hole 6 may penetrates a body of the insert 1 from the center of the upper surface 2 toward the center of the lower surface 3. Moreover, a central axis of the through hole 6 may match an imaginary line passing through the center of the upper surface 2 and the center of the lower surface 3. Therefore, the central axis of the through hole 6 may be replaced with the central axis S1 of the insert 1.

With Regard to Upper Surface 2

As described above, the upper surface 2 may include the first breaker portion 7 and the second breaker portion 9. More specifically, as illustrated in FIGS. 1 and 2, the first breaker portion 7 and the second breaker portion 9 may be aligned along the first side portion 21, in order, from a side of the first corner portion 23. Note that, as described above, the three cutting edge portions 51, 52, and 53 may be located as the cutting edge 5 on the side of the upper surface 2 in the first non-limiting embodiment. Accordingly, three first breaker portions 7 and three second breaker portions 9 may be also located on the upper surface 2 to correspond to the three cutting edge portions 51, 52, and 53.

First, the first breaker portion 7 is described. The first breaker portion 7 may extend along the first side portion 21 from the first corner portion 23. The cutting edge 5 may be located at the portion, which corresponds to the first corner portion 23 and the first side portion 21, on the intersecting line portion of the upper surface 2 and the side surface 4, hence, in different words, the first breaker portion 7 may be at least a part of a portion of the upper surface 2 along the cutting edge 5. More specifically, the first breaker portion 7 may be a portion of the upper surface 2 located inward of the cutting edge 5, and may be mainly involved in chip processing. Herein, "inward" represents a direction closer to the central axis S1, and "outward" described later represents a direction opposite to "inward" and a direction away from the central axis S1.

As illustrated in FIGS. 1 to 4, the first breaker portion 7 may include—a first end portion 7a and a second end portion 7b. The first end portion 7a may be located on the first corner portion 23. The second end portion 7b may be located farther from the first corner portion 23 than the first end portion 7a.

As illustrated in FIGS. 1, 2, 6, and 7, the first breaker portion 7 may include a first surface 71 and a second surface 72. The first surface 71 may be a portion of the first breaker portion 7 along the first side portion 21. The second surface 72 may be a portion located inward of the first surface 71.

Figure 6:
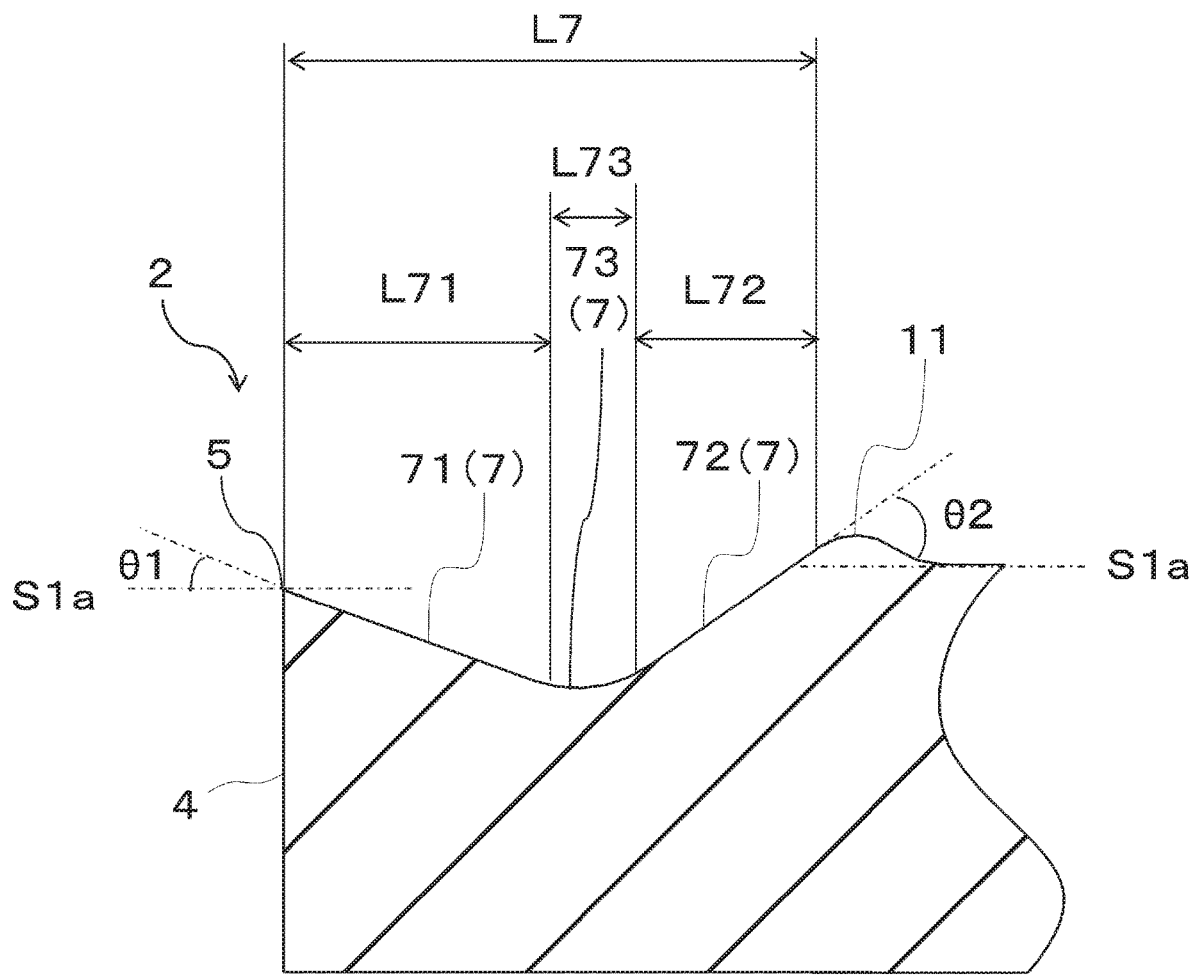
FIG. 6 is a cross-sectional view along A-A in FIG. 5.
Figure 7:
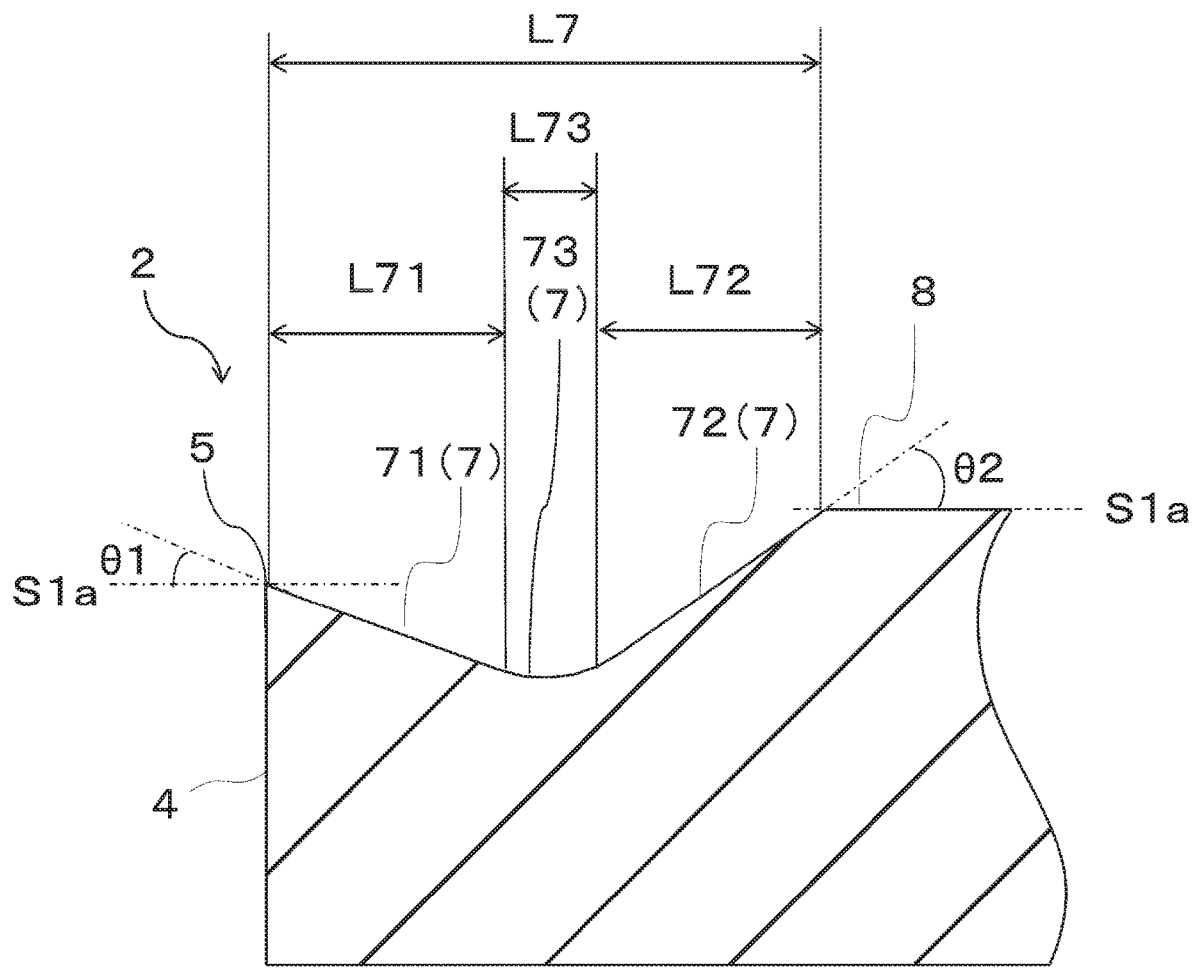
FIG. 7 is a cross-sectional view along B-B in FIG. 5.

The first surface 71 extends along the first side portion 21. As described above, the first breaker portion 7 may be a portion of the upper surface 2 along the cutting edge 5, and the first surface 71 may be located to extend from the cutting edge 5 in the first non-limiting embodiment. In other words, the first surface 71 may be connected to the cutting edge 5. Then, as illustrated in FIGS. 6 and 7, the first surface 71 may be inclined downward as the first surface 71 extends away from the first side portion 21. In other words, the first surface 71 may be inclined downward as the first surface 71 extends inward. Therefore, the first surface 71 may be a surface that functions as a so-called rake face, and plays a role in curling a chip generated by the cutting edge 5 during cut processing.

In the first non-limiting embodiment, an inclination angle θ1 of the first surface 71 may be constant along the first side portion 21. Herein, as illustrated in FIGS. 6 and 7, the inclination angle θ1 of the first surface 71 may be an inclination angle of the first surface 71 with respect to a reference plane S1a perpendicular to the central axis S1 of the insert 1. Further, the inclination angle θ1 may be substantially constant, and, for example, a difference of about ±5° may be allowed. The inclination angle θ1 may be, for example, 10 to 35°.

Furthermore, as illustrated in FIG. 2, in a length L71 of the first surface 71 in a direction perpendicular to the first side portion 21 (also simply referred to as a "first direction" below) in the top view, a length L71a and a length L71b in both end portions 71a and 71b of the first surface 71 in a direction along the first side portion 21 (also simply referred to as a "second direction" below), as illustrated in FIG. 2, may satisfy a relationship of L71a<L71b. In other words, the first surface 71 may have the length L71 greater at the second end portion 7b than at the first end portion 7a. Herein, the length L71 is a dimension of the first surface 71 along the first direction in the top view. The length L71 may be, for example, 5 to 10 mm.

The second surface 72 may be located inward of the first surface 71 and may extend along the first surface 71. In other words, the second surface 72 on the upper surface 2 may not be connected to the cutting edge 5. As described above, the first surface 71 may extend along the first side portion 21, hence a direction in which the second surface 72 extends is the second direction. Moreover, as illustrated in FIGS. 6 and 7, the second surface 72 may be inclined upward as the second surface 72 extends away from the first surface 71. In other words, the second surface 72 may be inclined upward as the second surface 72 extends inward. Therefore, the second surface 72 may be a surface that functions as a so-called breaker face, and plays a role, together with the first surface 71, in curling a chip generated by the cutting edge 5 during cut processing.

Next, the second breaker portion 9 is described. As illustrated in FIGS. 1 and 2, the second breaker portion 9 may be connected to the end portion (second end portion) 7b, which is farther away from the first corner portion 23, of the both end portions 7a and 7b of the first breaker portion 7 in the second direction. The second breaker portion 9 may extend along the first side portion 21 away from the first breaker portion 7. Note that, the second breaker portion 9 may be a portion that connects the first breaker portion 7 located along the cutting edge 5 to a mounting portion (second region) 8 described later in the first non-limiting embodiment. Moreover, as illustrated in FIGS. 1 and 3, the second breaker portion 9 may be inclined upward as the second breaker portion 9 extends away from the first breaker portion 7.

Then, in the top view, an intersection portion (ridge line) X of the second end portion 7b of the first breaker portion 7 and the second breaker portion 9 may be orthogonal to the first side portion 21, or inclined further away from the first corner portion 23 as the intersection portion X extends away from the first side portion 21. In other words, as illustrated in FIG. 2, an angle α formed by the ridge line X and the first side portion 21 may not be less than 90° in the top view.

In this way, the first breaker portion 7 mainly involved in chip processing and the second breaker portion 9 connected to the first breaker portion 7 may have the above-described configuration in the first non-limiting embodiment. In other words, the first surface 71 along the cutting edge 5 may have the constant inclination angle θ1 and may have the length L71 that satisfies L71a<L71b. Moreover, the second breaker portion 9 may be located such that the angle α formed by the ridge line X of the second end portion 7b of the first breaker portion 7 and the second breaker portion 9, and the first side portion 21 may not be less than 90°. When the first non-limiting embodiment has such a configuration, a generated chip stably contacts the first surface 71 and is curled smoothly, and the chip curled smoothly is discharged outward smoothly along the second surface 72. At this time, the second breaker portion 9 inclined upward may be located with respect to the first breaker portion 7 in the relationship as described above, and thus a possibility that even a chip having a long width generated in deep cutting processing contacts the second breaker portion 9 and is partially cured can be reduced. As a result, excellent chip dischargeability can be exhibited also in deep cutting processing.

Particularly, as illustrated in FIG. 2, the ridge line X of the first breaker portion 7 and the second breaker portion 9 may be perpendicular to the first side portion 21. In other words, the angle α formed by the ridge line X of the first breaker portion 7 and the second breaker portion 9, and the first side portion 21 may be 90°. In this case, a possibility that the second breaker portion 9 is clogged with a chip can be reduced, and a wider area of the mounting portion 8 on the upper surface 2 can also be secured while a long length of the cutting edge 5 on the first side portion 21 can be secured. Accordingly, the insert 1 in the first non-limiting embodiment is usable in a wide range of deep cutting processing and also improves seating stability while exhibiting excellent chip dischargeability. As a result, the insert 1 can exhibit excellent chip dischargeability and excellent cutting performance in a wide range of cutting conditions.

Note that, the ridge line X herein may be substantially orthogonal to the first side portion 21 in the top view. For example, the angle α formed by the ridge line X and the first side portion 21 may fall within a range of ±5° of 90°.

As illustrated in FIGS. 2, 6, and 7, the length L71 of the first surface 71 may be increased in accordance with an increase in distance from the first corner portion 23 in the first non-limiting embodiment. When such a configuration is satisfied, a chip is discharged more smoothly while excellent seating stability is exhibited. Thus, effects of both of an improvement in chip dischargeability and an improvement in seating stability can be enhanced to be excellent.

Note that, an increase in the length L71 of the first surface 71 is not limited to an increase in the length L71 across the entire region of the first surface 71 in the second direction, and there may be a portion of the first surface 71 without any change in the length L71. Furthermore, the length L71 may be increased in stages.

Note that, as illustrated in FIG. 2, the length L71 of the first surface 71 may be gradually increased at a constant ratio with an increase in distance from the first corner portion 23 in the first non-limiting embodiment. In other words, an edge portion located inward of the first surface 71 may be a straight line inclined so as to be away from the first side portion 21 with an increase in distance from the first corner portion 23. When such a configuration is satisfied, a chip can also contact the first surface 71 smoothly and be curled in both cases of shallow cutting processing in which a low amount of cutting is implemented and deep cutting processing in which a great amount of cutting is implemented. As a result, chip dischargeability is improved in a wide range of cutting conditions. For example, an edge portion located inward of the first surface 71 may be inclined by about 1 to 5° with respect to the first side portion 21 in the top view.

Moreover, as illustrated in FIG. 2, the ridge line X may be located farther from the first corner portion 23 than a straight line Y that passes through the center of the through hole 6 and is perpendicular to the first side portion 21. When such a configuration is satisfied, a length of the cutting edge 5 on the first side portion 21 can be secured long, and thus a difference in speed between the both end portions of the cutting edge 5 in the second direction can be increased. Accordingly, a generated chip is curled excellently by the first breaker portion 7 and the second breaker portion 9. As a result, an improvement in chip dischargeability in deep cutting processing is achieved.

Further, as illustrated in FIGS. 6 and 7, an inclination angle θ2 of the second surface 72 may be constant along the first side portion 21, and, as illustrated in FIG. 2, a length L72a and a length L72b respectively at both end portions 72a and 72b of the second surface 72 in the second direction may satisfy a relationship of L72a<L72b in the top view. In other words, the second surface 72 may have the inclination angle θ2 that is constant along the first side portion 21, and a length L72 of the second surface 72 may be greater at the second end portion 7b than at the first end portion 7a. When such a configuration is satisfied, an effect of stably bringing a chip having a long width that is generated in deep cutting processing into contact with the second surface 72 is increased. As a result, an effect of smoothly curling the generated chip is increased.

Herein, as illustrated in FIGS. 6 and 7, the inclination angle θ2 of the second surface 72 may be an inclination angle of the second surface 72 with respect to the reference plane S1a perpendicular to the central axis S1 of the insert 1, similarly to the inclination angle θ1 of the first surface 71. Further, the inclination angle θ2 may be substantially constant, and, for example, a difference of about ±5° may be generated. The inclination angle θ2 may be, for example, 20 to 45°.

Herein, the length L72 is a dimension of the second surface 72 along the first direction in the top view, similarly to the length L71. The length L72 may be, for example, 5 to 10 mm.

As illustrated in FIGS. 2, 6, and 7, the length L72 of the second surface 72 may be increased with an increase in distance from the first corner portion 23 in the first non-limiting embodiment. When such a configuration is satisfied, a chip having a long width that is generated in deep cutting processing more stably contacts the second surface 72. As a result, chip dischargeability is further increased.

Note that, an increase in the length L72 of the second surface 72 is not limited to an increase in the length L72 across the entire region of the second surface 72 in the second direction, and there may be a portion of the second surface 72 without any change in the length L72. Furthermore, the length L72 may be increased in stages.

Note that, as illustrated in FIG. 2, the length L72 of the second surface 72 may be gradually increased at a constant ratio with an increase in distance from the first corner portion 23 in the first non-limiting embodiment, similarly to the first surface 71. In other words, an edge portion located inward of the second surface 72 may be a straight line inclined so as to be away from the first side portion 21 with an increase in distance from the first corner portion 23. When such a configuration is satisfied, a chip having a long width that is generated in deep cutting processing more stably contacts the second surface 72. As a result, chip dischargeability is further increased. For example, an edge portion located inward of the second surface 72 may be inclined by about 3 to 10° with respect to the first side portion 21 in the top view. Note that, the inclination angle of the edge portion located inward of the second surface 72 may be greater than the inclination angle of the edge portion located inward of the first surface 71.

The first surface 71 and the second surface 72 may have a portion having a flat shape and a portion having a curved shape. Herein, the flat shape is intended to include not only a flat surface in the strict sense but also include slight irregularities and curve as long as a function thereof is achieved. This also applies to the curved shape. Note that, when the first surface 71 has a flat shape in a cross-section perpendicular to the first side portion 21, a chip is also more easily discharged smoothly also in a case where a width of a chip is changed due to change in amount of cutting during cut processing. Accordingly, chip dischargeability is improved. Note that, chip dischargeability is also similarly improved also when the second surface 72 has a flat shape in a cross-section perpendicular to the first side portion 21.

Then, as illustrated in FIG. 3, the cutting edge 5 may be inclined downward as the cutting edge 5 extends away from the first corner portion 23 in the region along the first breaker portion 7 in a side view. When such a configuration is satisfied, in deep cutting processing, a reduction in thrust force applied during cut processing can be achieved and vibration during cut processing can be reduced. As a result, an improvement in machined surface accuracy is achieved. An inclination angle of the cutting edge 5 may be, for example, 1 to 10°. Herein, the inclination angle of the cutting edge 5 may be an inclination angle of the cutting edge 5 with respect to the reference plane S1a perpendicular to the central axis S1 of the insert 1.

As illustrated in FIGS. 1 and 2, the second breaker portion 9 may be one curved surface. When such a configuration is satisfied, an inclination of the second breaker portion 9 from the first breaker portion 7 toward the mounting portion 8 can be gentle while a portion functioning as the mounting portion 8 is secured in a portion of the upper surface 2 along the first side portion 21 on which the cutting edge 5 is located. Thus, an impact caused when a chip contacts the second breaker portion 9 can be reduced while excellent seating stability is provided. Accordingly, a possibility that the second breaker portion 9 is clogged with a chip can be further reduced while excellent seating stability is provided, and chip dischargeability is improved while excellent seating stability is provided.

Figure 5:
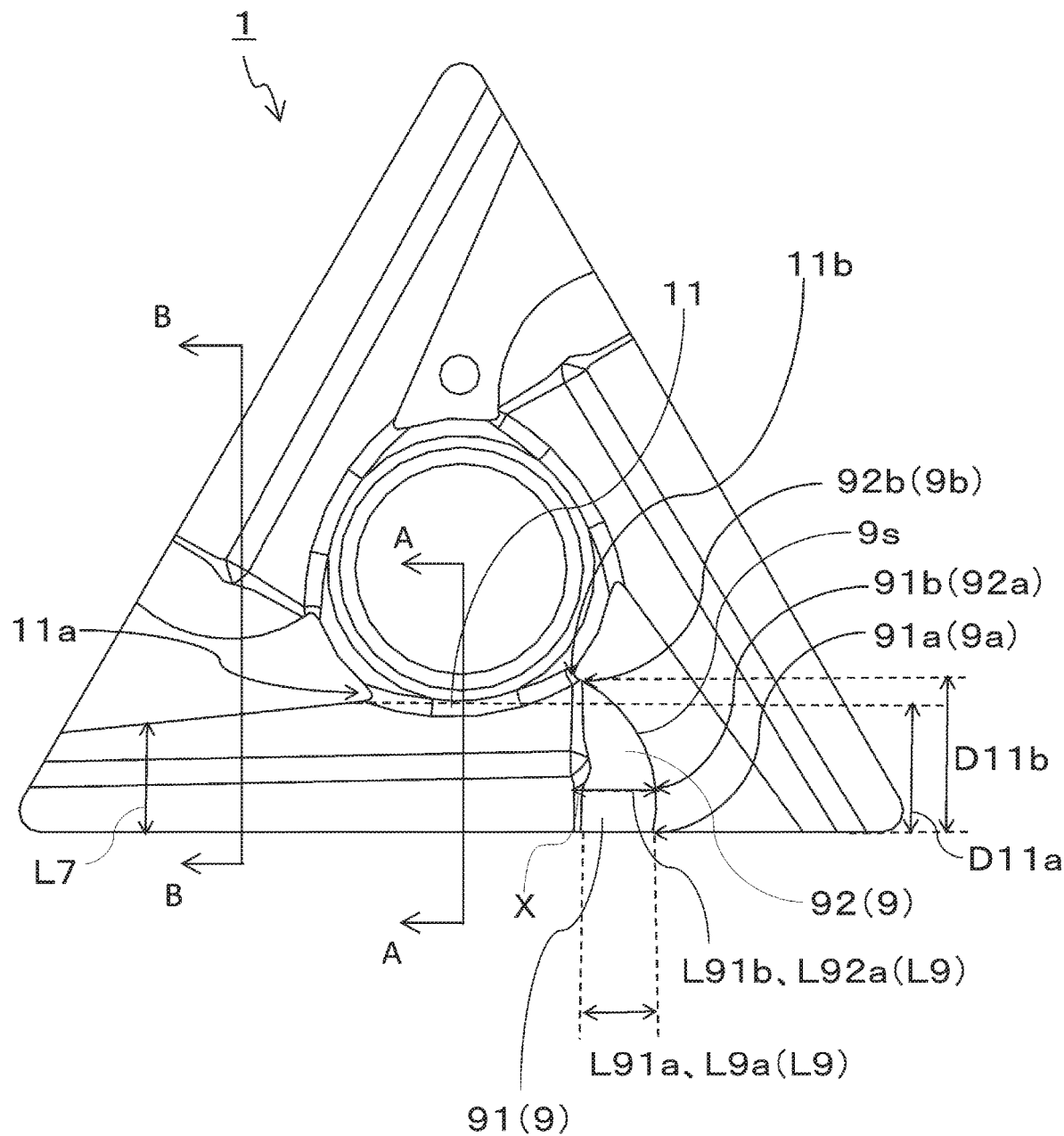
FIG. 5 is a view illustrating a cross-sectional position of FIGS. 6 and 7.

Furthermore, as illustrated in FIG. 5, the second breaker portion 9 may include a third end portion 9a located on an outward side and a fourth end portion 9b located on an inward side in the first direction. At this time, the third end portion 9a may be an end portion located on the first side portion 21, and the fourth end portion 9b may be an end portion located inward of the third end portion 9a. Moreover, a length L9 of the second breaker portion 9 in the second direction may be greater on a side of the third end portion 9a than on a side of the fourth end portion 9b. In other words, as illustrated in FIG. 5, a length L9a on the side of the third end portion 9a and a length L9b (not illustrated) on the side of the fourth end portion 9b may satisfy a relationship of L9a>L9b. When such a configuration is satisfied, an inclination of the second breaker portion 9 can be gentle while a wider area of the mounting portion 8 on the upper surface 2 is secured. As a result, seating stability is improved while excellent chip dischargeability is exhibited.

Note that, in the first non-limiting embodiment an outer edge of the second breaker portion 9 may have an arc shape as described later. In this case, the length L9b of the second breaker portion 9 on the side of the fourth end portion 9b is zero. However, the length L9b of the second breaker portion 9 on the side of the fourth end portion 9b is not limited to zero and may have any value, and may have a value that satisfies the relationship of L9a>L9b. The length L9 may be, for example, 0 to 2 mm.

Then, as illustrated in FIG. 5, an outer edge 9s of the second breaker portion 9 may have an arc shape in the top view in the first non-limiting embodiment. When such a configuration is satisfied, an inclination of the second breaker portion 9 can be gentle while a portion functioning as the mounting portion 8 is secured in a portion of the upper surface 2 along the first side portion 21 on which the cutting edge 5 is located. Thus, an impact caused when a chip contacts the second breaker portion 9 can be reduced while excellent seating stability may be provided. Accordingly, a possibility that the second breaker portion 9 is clogged with a chip can be further reduced while excellent seating stability is provided, and chip dischargeability is further improved while excellent seating stability may be provided.

Note that, as illustrated in FIG. 5, the outer edge 9s of the second breaker portion 9 may have an arc shape, with an intersection point of the ridge line X and the through hole 6 as a starting point, in the top view in the first non-limiting embodiment. Herein, in the top view, the outer edge 9s of the second breaker portion 9 may be an edge portion of an edge portion of the second breaker portion 9 that is not connected to the first breaker portion 7 and may be an edge portion connected to the mounting portion 8 of the upper surface 2.

Further, as illustrated in FIGS. 2 and 5, the second breaker portion 9 may include a first portion 91 located on the side of the third end portion 9a and a second portion 92 located on the side of the fourth end portion 9b. Moreover, as illustrated in FIG. 2, a length L91 of the first portion 91 in the second direction may be increased gradually inward, and a length L92 of the second portion 92 in the second direction may be reduced gradually inward. In other words, as illustrated in FIG. 5, the length L9 of the second breaker portion 9 has a maximum value (L91b and L92a) at a boundary between the first portion 91 and the second portion 92, and the length L9 of the second breaker portion 9 may satisfy L92b<L91a<L91b and L92a.

When such a configuration is satisfied, an inclination of the second breaker portion 9 can be gentle, and thus an impact caused when a chip contacts the second breaker portion 9 can be reduced. Accordingly, a possibility that the second breaker portion 9 is clogged with a chip can be further reduced, and chip dischargeability is further improved. In addition, when both of the upper surface 2 and the lower surface 3 of the insert 1 are usable, a portion functioning as the mounting portion 8 can be secured long in a portion of the upper surface 2 along the first side portion 21 on which the cutting edge 5 is located. As a result, excellent chip dischargeability and seating stability can be provided simultaneously.

Note that, as described above, the second breaker portion 9 may be inclined upward as the second breaker portion 9 extends away from the first breaker portion 7, and thus both of the first portion 91 and the second portion 92 may be inclined upward as the first portion 91 and the second portion 92 extend away from the first breaker portion 7.

Furthermore, as illustrated in FIGS. 1 and 4, the upper surface 2 may further include the mounting portion (second region) 8 and a first region 11 in the first non-limiting embodiment. The mounting portion 8 extends along the first side portion 21 away from the first breaker portion 7 and may be also connected to the second breaker portion 9. The mounting portion 8 may be a flat surface perpendicular to the central axis S1 of the insert 1. Accordingly, at least a part of the mounting portion 8 contacts the holder 103 when the insert 1 is mounted on the holder 103. Moreover, the first region 11 connects the first breaker portion 7 to the through hole 6. The first region 11 may be located below the mounting portion 8. When such a configuration is satisfied, while a portion that contacts the holder 103 is secured, a possibility that a portion connecting the first breaker portion 7 to the through hole 6 contacts the holder 103 when the insert 1 is fixed to the holder 103 can be reduced. In other words, while a portion contacting the holder 103 is secured, a possibility that a portion having a small thickness in the insert 1 due to formation of the first breaker portion 7 contacts the holder 103, when the insert 1 is fixed to the holder 103, can be reduced. As a result, damage to the insert 1 can be reduced, and an improvement in a tool life may be achieved.

Herein, the mounting portion 8 having a flat surface perpendicular to the central axis S1 of the insert 1 may represent a configuration in which the mounting portion 8 and the central axis S1 of the insert 1 are substantially perpendicular to each other, and an angle formed by the mounting portion 8 and the central axis S1 of the insert 1 may be, for example, about ±5° of 90°.

Note that, as described above, the first breaker portion 7 may be connected to the through hole 6 with the first region 11 therebetween in the first non-limiting embodiment, and thus, as illustrated in FIGS. 1 and 2, the mounting portion 8 includes three regions 81, 82, and 83 corresponding to the three side portions S respectively. With such a configuration, when the insert 1 is caused to contact and be mounted on the holder 103, the insert 1 contacts the holder 103 at three support points. Thus, the insert 1 can be stably mounted on the holder 103. Note that, a configuration of the mounting portion 8 is not limited to such a configuration, and the mounting portion 8 may include the region 81 corresponding to at least the first side portion 21.

Furthermore, as illustrated in FIG. 5, the first region 11 may include a fifth end portion 11a and a sixth end portion 11b in the first non-limiting embodiment. At this time, the fifth end portion 11a may be located on the side of the first corner portion 23 of both end portions of the first region 11 in the second direction. The sixth end portion 11b may be located farther away from the first corner portion 23 than the fifth end portion 11a of the both end portions of the first region 11 in the second direction, that is, the sixth end portion 11b may be located on a side of the second breaker portion 9. Moreover, a distance D11b between the first side portion 21 and the sixth end portion 11b may be greater than a distance D11a between the first side portion 21 and the fifth end portion 11a when viewed from directly above. When such a configuration is satisfied, an effect of stably bringing a chip that is generated in deep cutting processing, in which a great amount of cutting is implemented, into contact with the first breaker portion 7 is increased. As a result, chip dischargeability is improved. The distance D11a may be, for example, 0.5 to 3.5 mm. The distance D11b may be, for example, 1 to 4 mm.

Further, in the first non-limiting embodiment as illustrated in FIG. 3, the first region 11 may have a recessed shape in a side view. When such a configuration is satisfied, an effect of reducing a possibility that a portion, where a thickness of the insert 1 becomes smaller contacts the holder 103, due to locating of the first breaker portion 7, when the insert 1 is fixed to the holder 103, is increased. As a result, an effect of reducing damage to the insert 1 may be enhanced.

Furthermore, as illustrated in FIG. 6, the first region 11 may have a protruding curved surface in a cross-section perpendicular to the first side portion 21 in the first non-limiting embodiment. When such a configuration is satisfied, strength of the first breaker portion 7 is increased. Thus, even when a generated chip contacts the first breaker portion 7 with a great impact, stable chip processing performance can be exhibited. As a result, excellent chip dischargeability can be exhibited under a wide range of cutting conditions.

In the first non-limiting embodiment, as illustrated in FIGS. 1, 2, 6, and 7, the first surface 71 and the second surface 72 may be connected with a recessed curved surface 73, namely, a fillet surface. When such a configuration is satisfied, a possibility that the insert 1 is damaged when a load is imposed on the cutting edge 5 during cut processing is reduced. Then, the recessed curved surface 73 may have a length L73 that is constant in the first direction when viewed from directly above. When such a configuration is satisfied, a discharge direction of a chip can be stable in a case where an amount of cutting is changed during cut processing. Accordingly, an improvement in chip dischargeability is achieved. Note that, the first surface 71 and the second surface 72 may be located to be directly connected to each other, or may be connected to each other with one surface or a plurality of surfaces other than the recessed curved surface 73.

In the first non-limiting embodiment, as described above, the first surface 71 and the second surface 72 may be located to be directly connected to each other, or may be connected to each other with another surface therebetween. In either case, as illustrated in FIGS. 5 to 7, the length L7 of the first breaker portion 7 in the first direction may be increased with an increase in distance from the first corner portion 23. When such a configuration is satisfied, a chip having a long width that is generated in deep cutting processing can be discharged excellently.

Note that, a land face located along the cutting edge 5 may be located between the cutting edge 5 and the first breaker portion 7. When such a configuration is satisfied, strength of the cutting edge 5 may be increased, and a possibility of occurrence of damage to the cutting edge 5 can be reduced.

Lastly, examples of a material of the insert 1 in the first non-limiting embodiment having the above-described configuration include cemented carbide alloy, cermet, or the like. Examples of composition of the cemented carbide alloy include WC—Co, WC—TiC—Co, WC—TiC—TaC—Co, or the like. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound, such as titanium carbide (TiC) or titanium nitride (TiN), is the main component.

The surface of the insert 1 may be coated with a coating film by using a chemical vapor deposition (CVD) method or a physical vapor deposition (PVD) method. Examples of composition of the coating film include titanium carbide (TiC), titanium nitride (TiN), titanium carbonitride (TiCN), alumina ($Al_2O_3$), and the like.

Second Non-Limiting Embodiment

Next, a detailed description will be given below of a cutting insert according to a second non-limiting embodiment of the present disclosure with reference to FIGS. 8 to 15. Note that, a portion different from that in the first non-limiting embodiment is mainly described in the following description. Thus, the description in the first non-limiting embodiment is quoted for a portion having a configuration similar to that in the first non-limiting embodiment, and description thereof is omitted.

Figure 8:
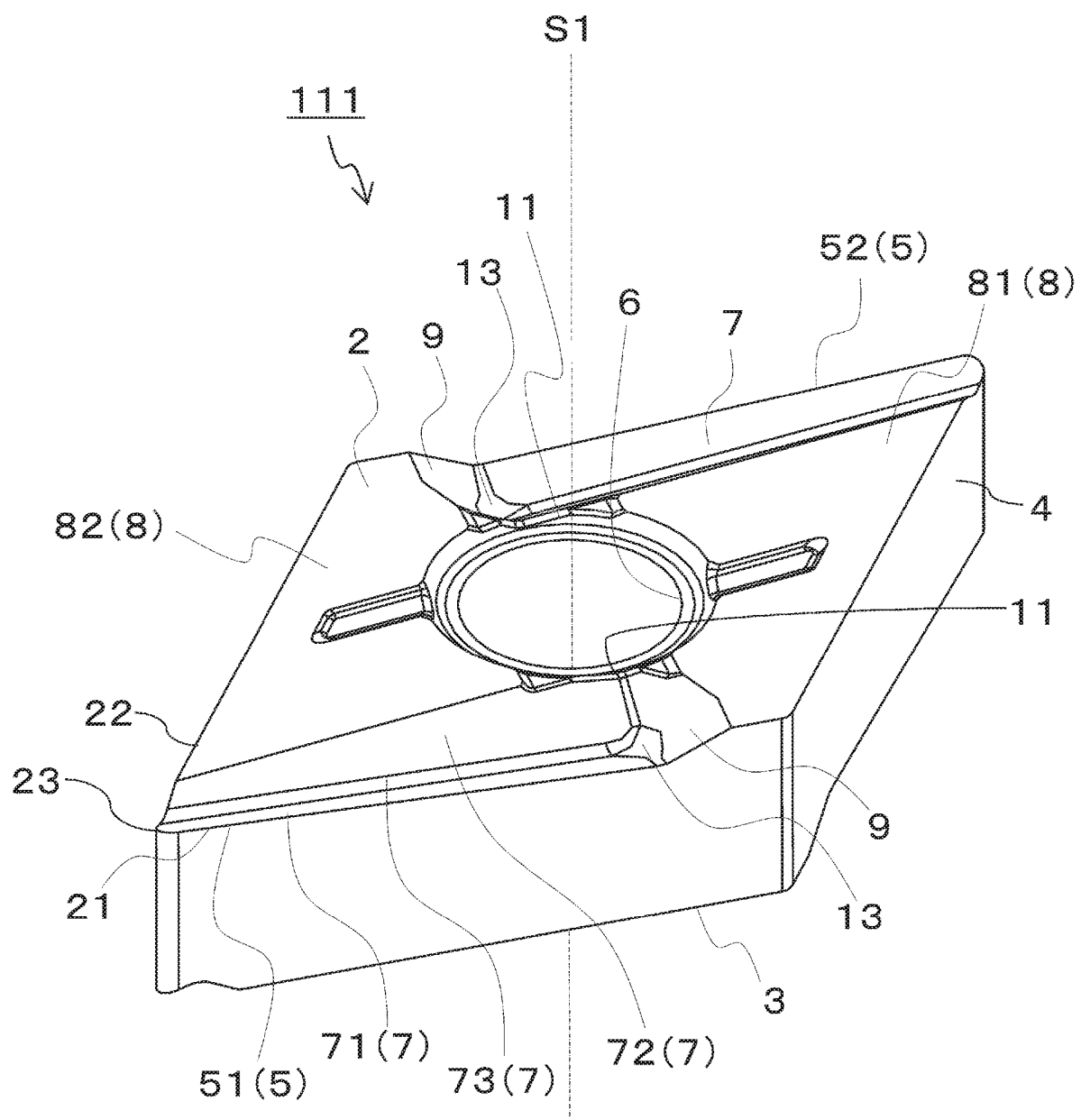
FIG. 8 is a perspective view illustrating a cutting insert according to a second non-limiting embodiment of the present disclosure.
Figure 9:
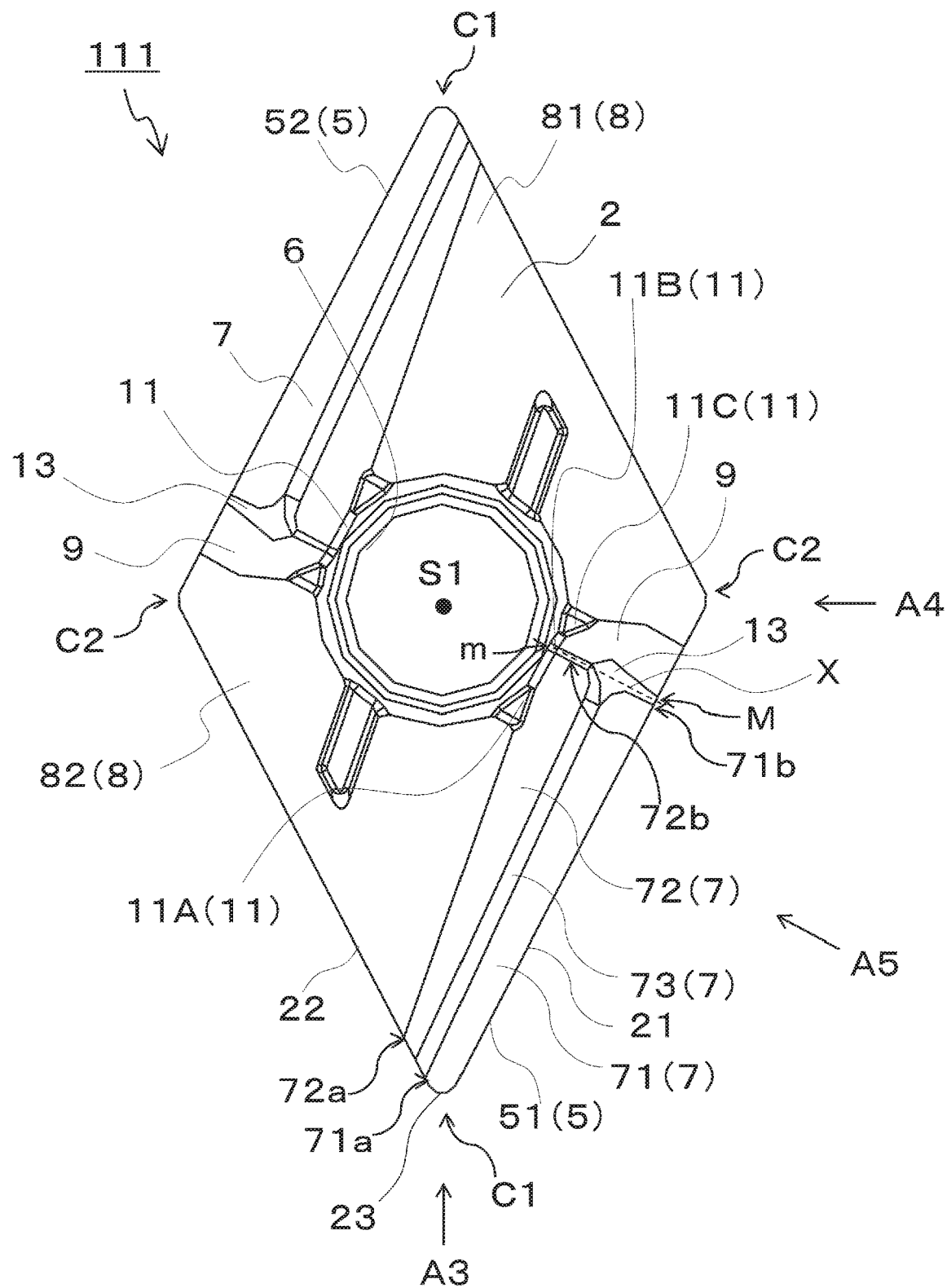
FIG. 9 is a top view of the cutting insert illustrated in FIG. 8.

An insert 111 according to the second non-limiting embodiment illustrated in FIGS. 8 to 15 is different from the insert 1 according to the first non-limiting embodiment described above in that an upper surface 2 has a substantially quadrilateral shape. In other words, as illustrated in FIG. 9, a shape of the upper surface 2 of the insert 111 in a plan view (top view) may be a substantially quadrilateral shape, more specifically, a substantially rhombic shape. More specifically, the upper surface 2 has a substantially rhombic shape including two acute corners C1 and two obtuse corners C2, and may have a 180 degrees rotation-symmetrical shape with respect to the center of the upper surface 2 (central axis S1 of the insert). Herein, the acute corner C1 corresponds to a first corner portion 23, and two side portions forming the acute corner C1 correspond to a first side portion 21 and a second side portion 22.

Figure 10:
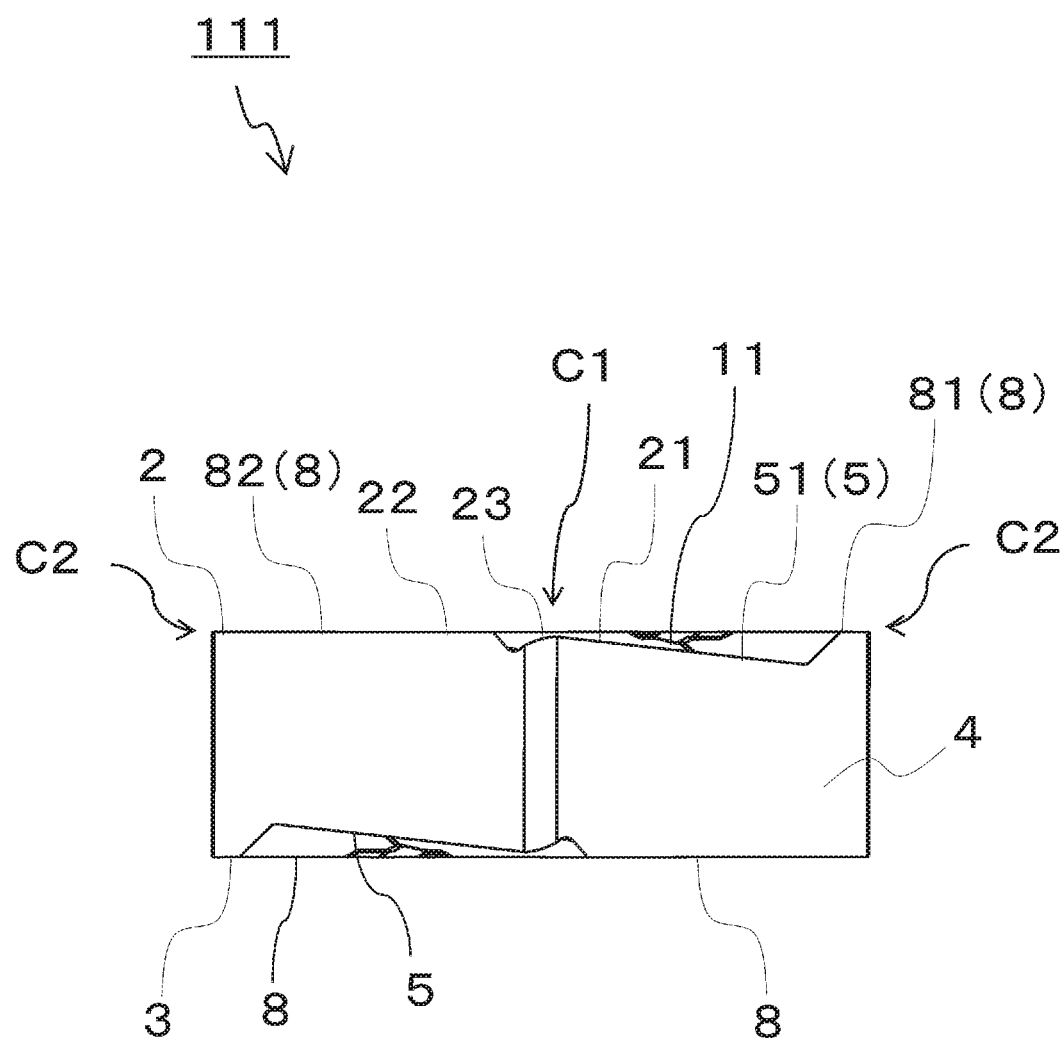
FIG. 10 is a side view from a direction A3 of the cutting insert illustrated in FIG. 9.
Figure 11:
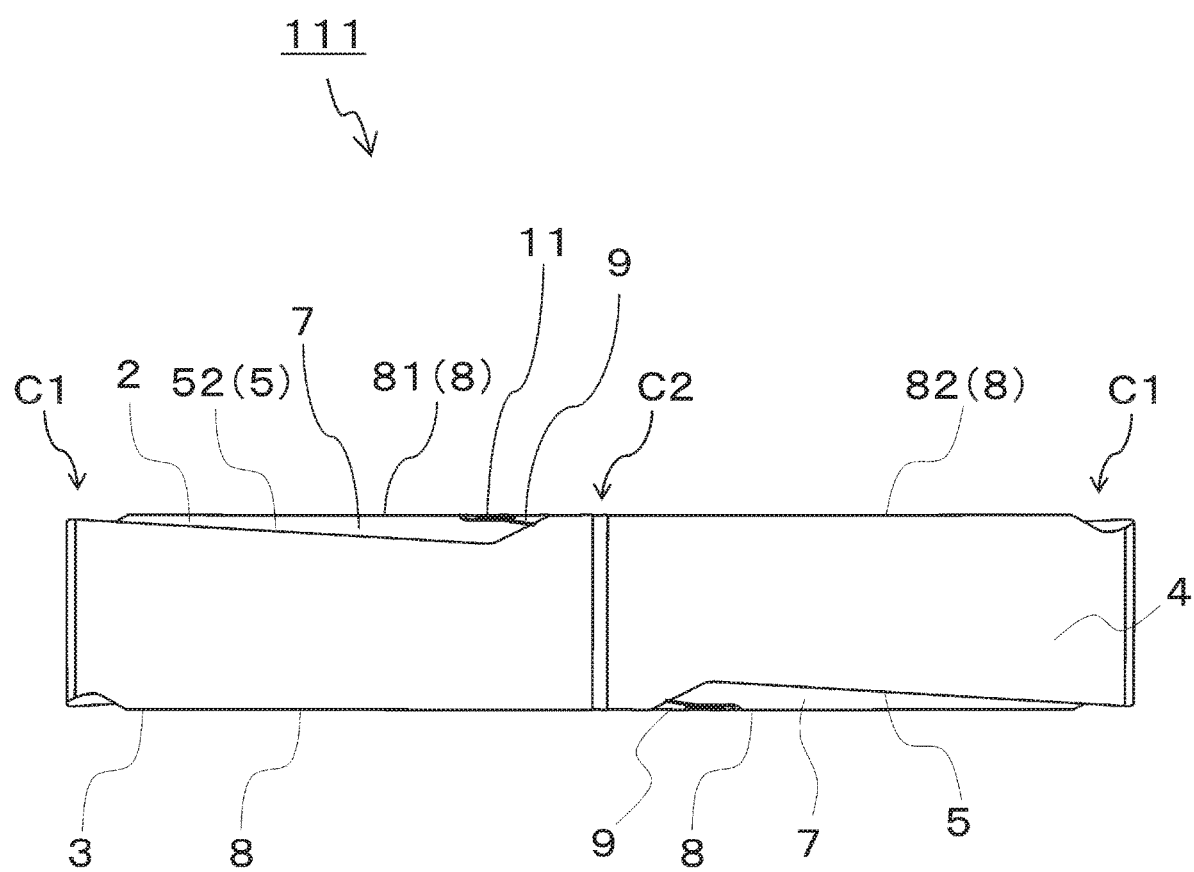
FIG. 11 is a side view from a direction A4 of the cutting insert illustrated in FIG. 9.

Then, as illustrated in FIGS. 10 and 11, in the insert 111 similarly to the insert 1, the side of a lower surface 3 may be configured to have a shape in which a configuration on the side of the upper surface 2 is reversed in such a way that the insert 111 is usable in a state of being turned over. Accordingly, the insert 111 may be also rotation-symmetrical with respect to a line, which is perpendicular to the paper surface of FIG. 10, as the center. As a result, in the second non-limiting embodiment, cut processing can be performed at two places (acute corners C1) of each of the upper surface 2 and the lower surface 3, which are corners at four places in total.

Therefore, in the second non-limiting embodiment, as illustrated in FIGS. 8 and 9, a cutting edge 5 includes two cutting edge portions 51 and 52 extending from the two acute corners C1. Thus, two first breaker portions 7 and two second breaker portions 9 are located on the upper surface 2. Moreover, each configuration of the first breaker portion 7 and the second breaker portion 9 may be similar to that in the insert 1 in the first non-limiting embodiment. Accordingly, in the insert 111 similarly to the insert 1, a chip can also be discharged smoothly in so-called deep cutting processing in which a great amount of cutting is implemented.

In the second non-limiting embodiment, as illustrated in FIG. 9, the first breaker portion 7 and the second breaker portion 9 may be connected to each other with a fillet surface 13. In such a case, as illustrated in FIG. 9, a straight line passing through a center point M at an outward end portion of the fillet surface 13 and a center point m at an inward end portion of the fillet surface 13 can be a border line X of the first breaker portion 7 and the second breaker portion 9. When the first breaker portion 7 and the second breaker portion 9 are connected to each other with the fillet surface 13, a possibility that the insert 111 is damaged can be reduced.

Figure 12:
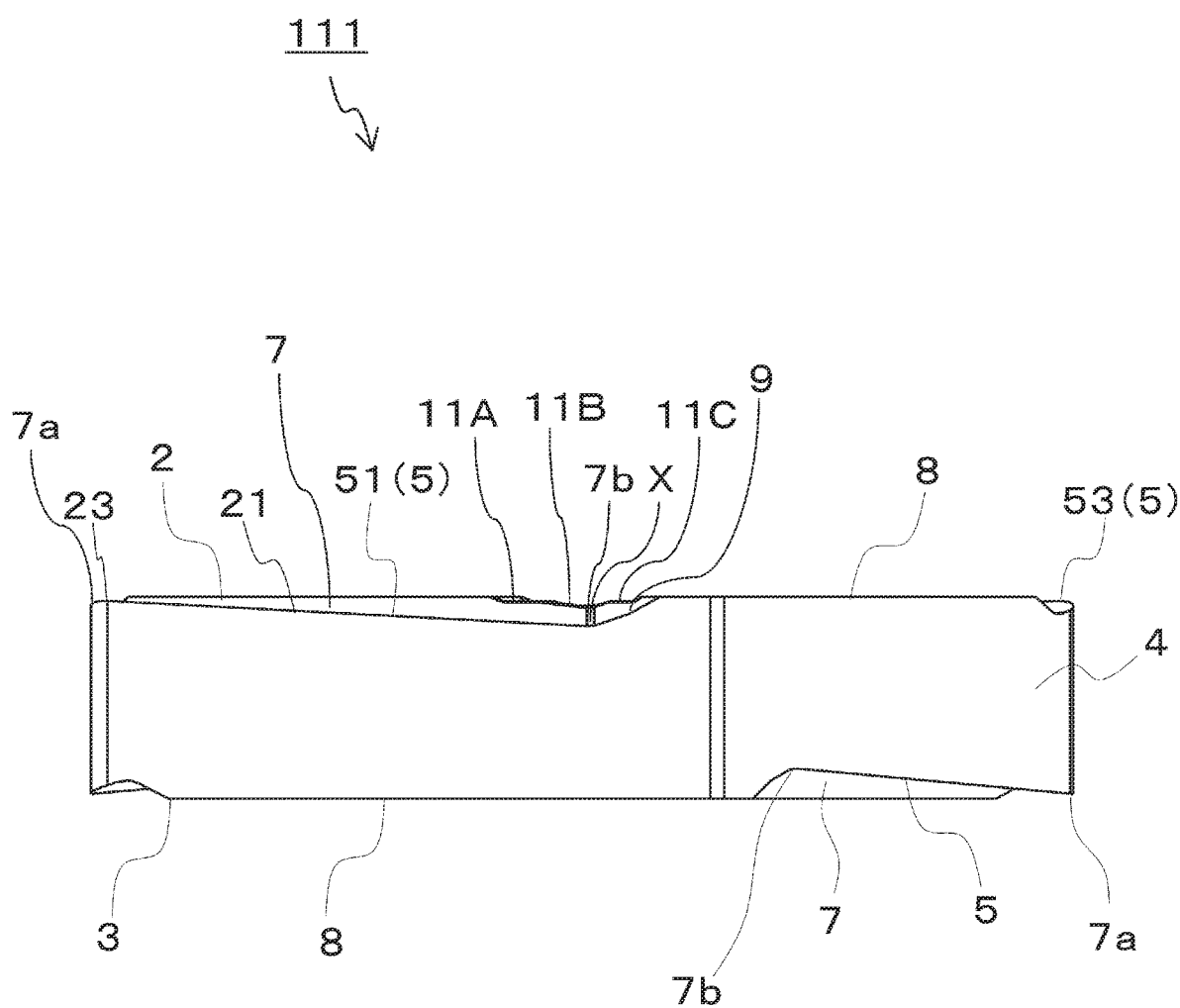
FIG. 12 is a side view from a direction A5 of the cutting insert illustrated in FIG. 9.

The insert 111 in the second non-limiting embodiment also includes a first region 11 that connects the first breaker portion 7 to a through hole 6 on the upper surface 2, similarly to the insert 1, but a configuration of the first region 11 may be the following configuration in the second non-limiting embodiment. In other words, in the second non-limiting embodiment, as illustrated in FIGS. 8 to 12, the first region 11 may be connected to not only the first breaker portion 7 but also the second breaker portion 9. More specifically, as illustrated in FIGS. 9 and 12, the first region 11 may include three portions 11A, 11B, and 11C, in order, from the side of the first corner portion 23. The portions 11A and 11B connect the first breaker portion 7 to the through hole 6. Moreover, the portion 11C connects the second breaker portion 9 to the through hole 6. In other words, a part (11C) of the first region 11 connects the second breaker portion 9 to the through hole 6 in the second non-limiting embodiment.

Figure 13:
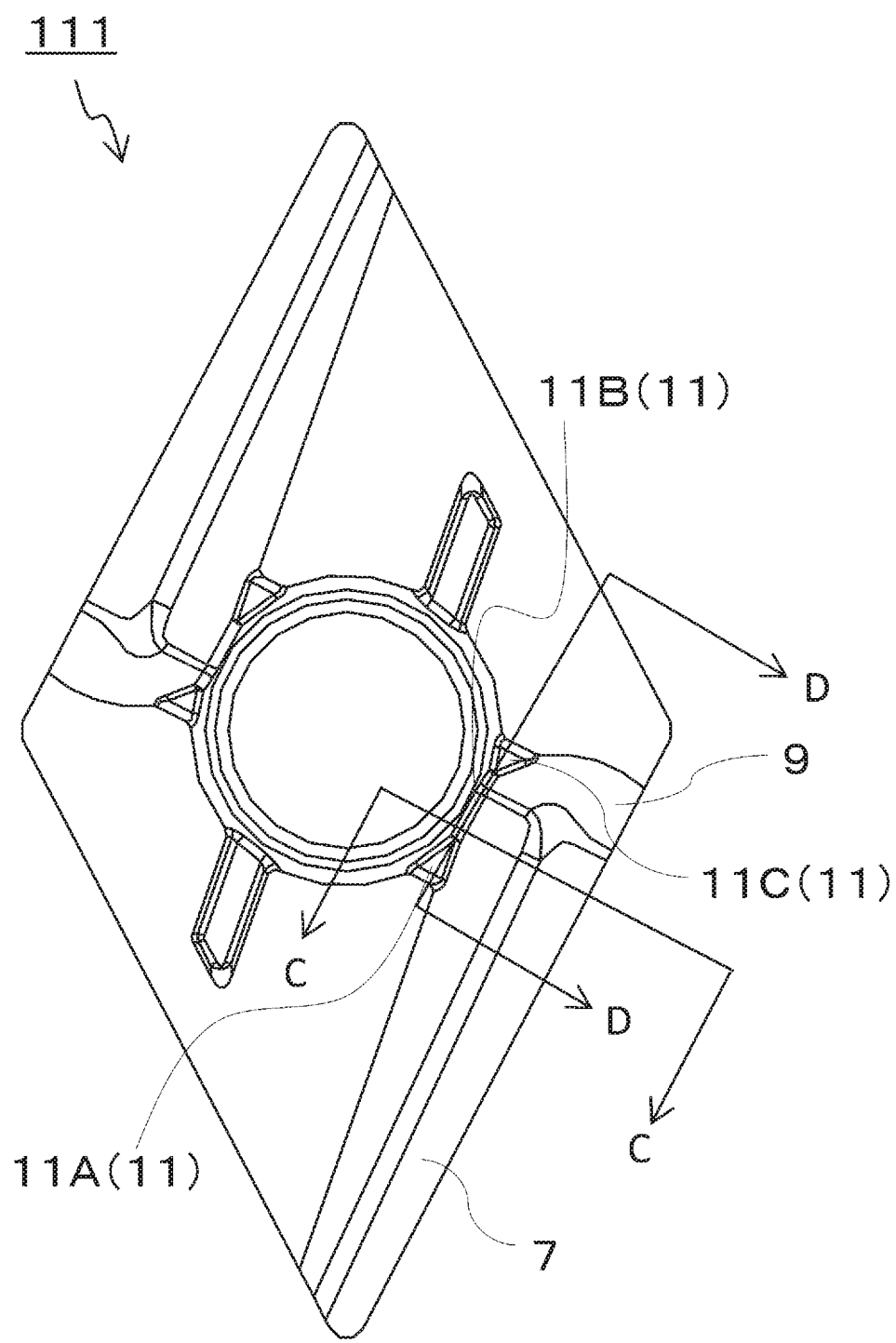
FIG. 13 is a view illustrating a cross-sectional position of FIGS. 14 and 15.
Figure 14:
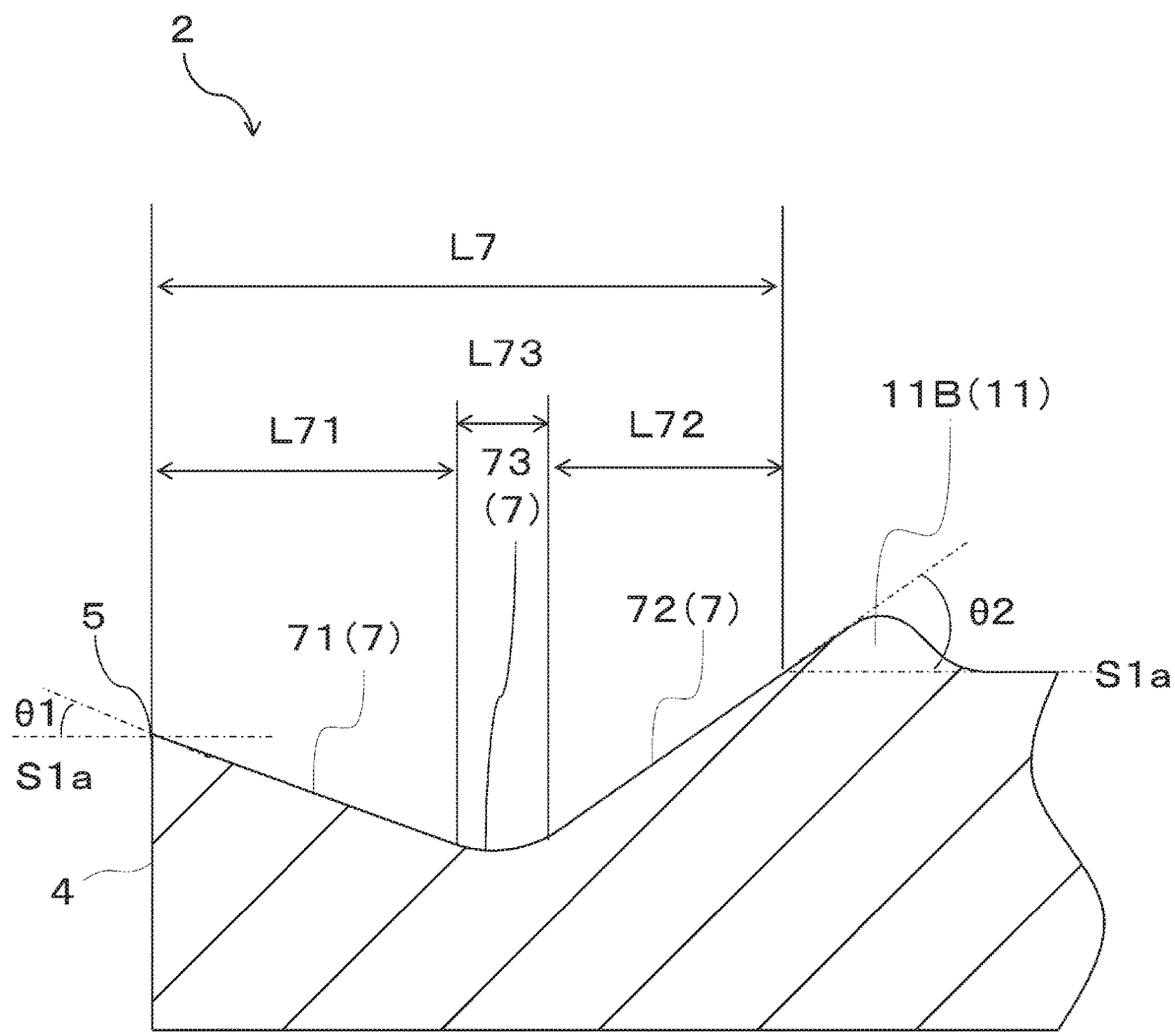
FIG. 14 is a cross-sectional view along C-C in FIG. 13.

Moreover, the portion 11B located at the center of the first region 11 has a recessed shape in the side view as illustrated in FIG. 12, and has a protruding curved surface in a cross-section perpendicular to the first side portion 21 as illustrated in FIG. 13. When such a configuration is satisfied, as described above in the first non-limiting embodiment, a possibility that a portion having a small thickness of the insert 111 contacts a holder 103 can be reduced, and strength of the first breaker portion 7 can also be increased. Accordingly, damage to the insert 111 can be reduced.

Figure 15:
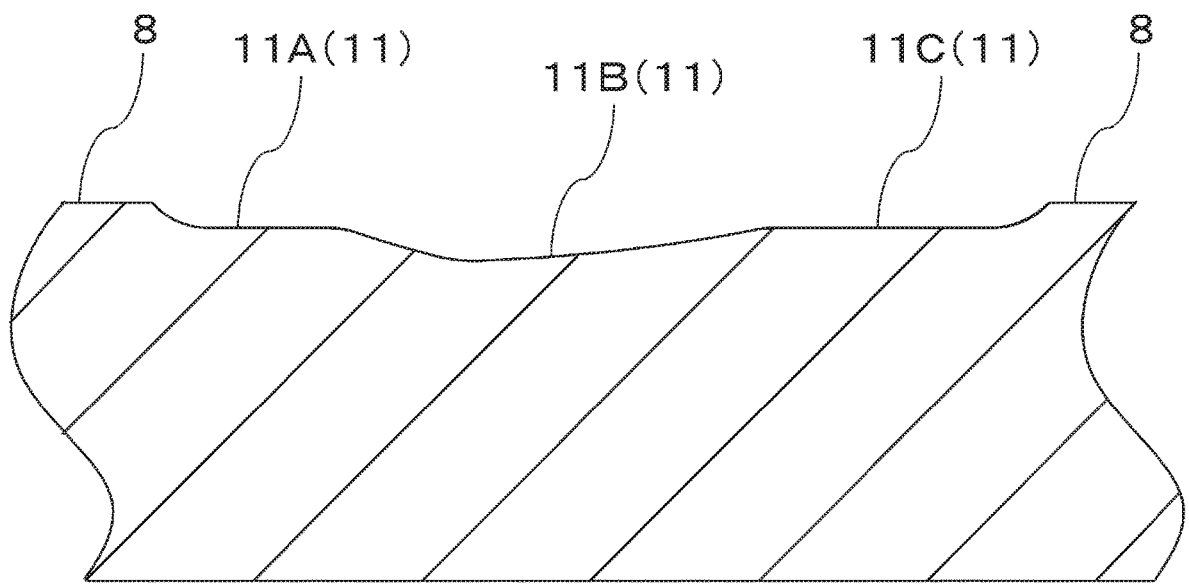
FIG. 15 is a cross-sectional view along D-D in FIG. 13.

In the second non-limiting embodiment, as illustrated in FIG. 9, the portions 11A and 11C located on both sides of the first region 11 may both be connected to a second region (mounting portion) 9. In other words, it can be said that the portions 11A and 11C are portions that connect the mounting portion 8 to the portion 11B. In the second non-limiting embodiment, as illustrated in FIGS. 12 and 15, such portions 11A and 11C each may have a flat surface. When such a configuration is satisfied, the flat portion 11A is located at a connecting portion among the first breaker portion 7, the through hole 6, and the mounting portion 8, and the flat portion 11C is located at a connecting portion among the second breaker portion 8, the through hole 6, and the mounting portion 8. Accordingly, these connecting portions each can be less likely to have a sharp edge, and thus strength of the insert 111 can be increased.

Therefore, the insert 111 in the second non-limiting embodiment includes the first region 11 including these three portions, and thus damage to the insert 111 can be reduced, and strength of the insert 111 can also be increased. As a result, service life of the insert 111 can be prolonged.

Furthermore, in the second non-limiting embodiment, as described above, the cutting edge 5 includes the two cutting edge portions 51 and 52, and thus the two first breaker portions 7 and the two second breaker portions 9 are located on the upper surface 2. Thus, the mounting portion 8 also includes two regions 81 and 82. In this way, a portion that contacts the holder can be secured wide on the upper surface 2 in the second non-limiting embodiment.

Cutting Tool

Next, a description will be given of a cutting tool of a non-limiting aspect of the present disclosure using the drawings.

As illustrated in FIGS. 16 to 21, the cutting tool 101 in a non-limiting aspect of the present disclosure includes the insert 1 exemplified by the non-limiting aspects of the present disclosure described above and the holder 103 on which the insert 1 is mounted.

The holder 103 in a non-limiting aspect of the present disclosure has a slender, elongated rod shape. In one end portion (tip portion) thereof, an insert pocket 104 in which the insert 1 is mounted may be formed. The insert pocket 104 may be a portion in which the insert 1 is mounted, and which is open to a tip surface 1031, an upper surface 1032, and a side surface 1033 of the holder 103. For a material of the holder 103, steel, cast iron, or the like, for example, can be used. In particular, among these materials steel with a high toughness can be used.

Next, a method for mounting the insert 1 to the holder 103 is described.

Figure 17:
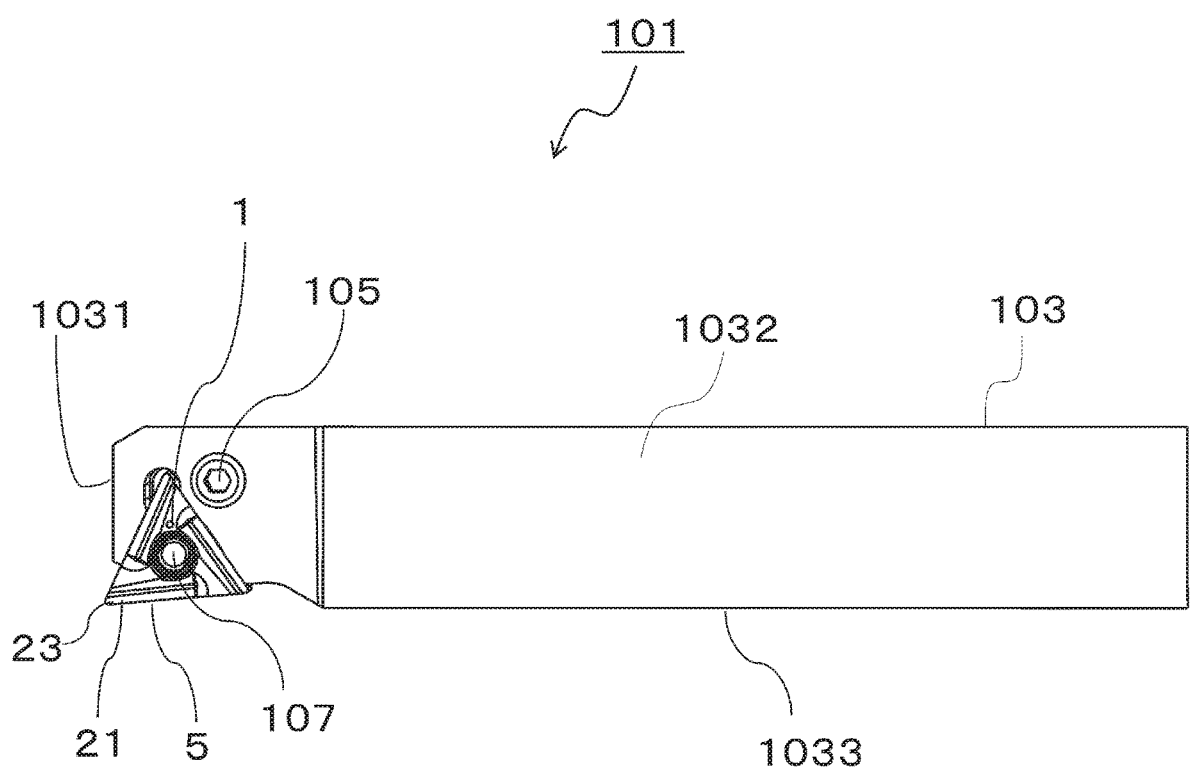
FIG. 17 is a top view of the cutting tool illustrated in FIG. 16.
Figure 18:
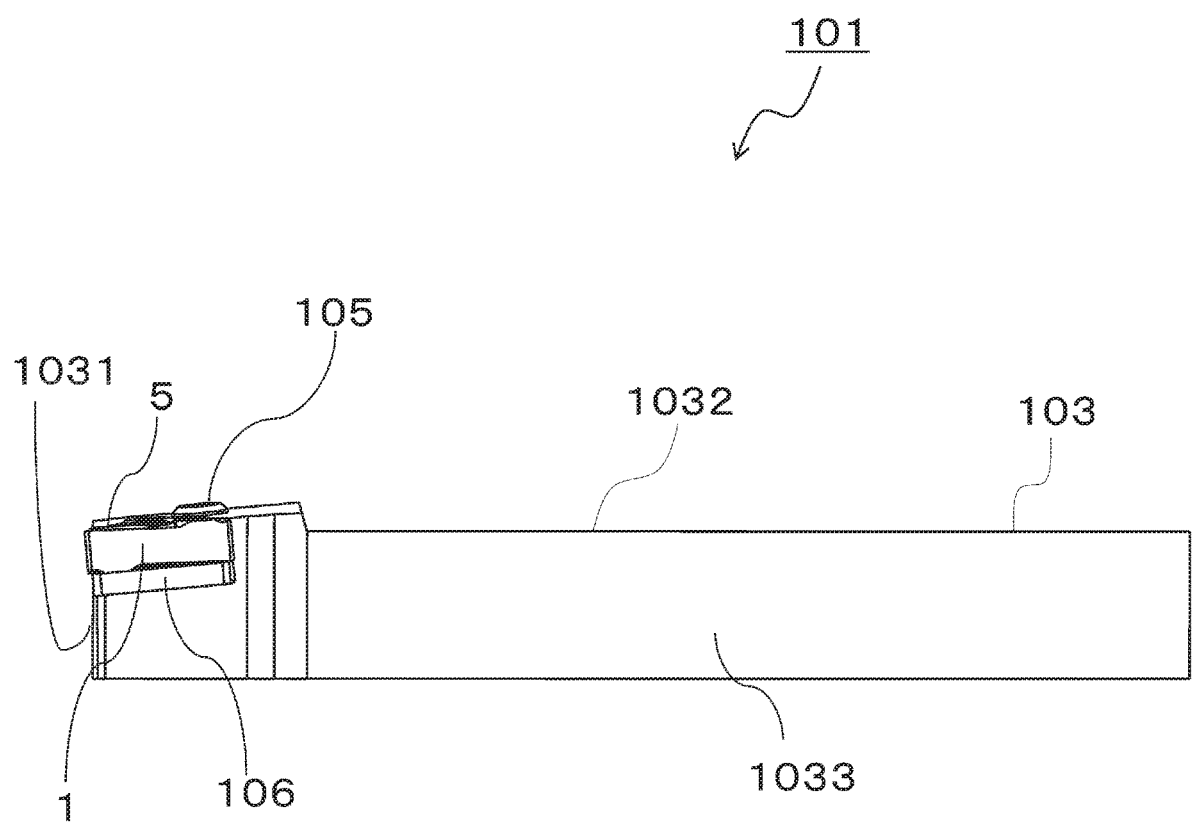
FIG. 18 is a side view of the cutting tool illustrated in FIG. 16.

The insert 1 may be configured to be mounted in the insert pocket 104, with the cutting edge 5 protruding outward of an outer periphery of the holder 103. More specifically, as illustrated in FIG. 17, the insert 1 may be mounted to the holder 103 such that the cutting edge 5 is used as a main cutting edge. In other words, the first side portion 21 on which the cutting edge 5 is located may be located on a side of the side surface 1033 of the holder 103, and the first corner portion 23 may be located on a corner portion formed by the tip surface 1031 and the side surface 1033.

Then, in a non-limiting aspect of the present disclosure, the insert 1 may be fixed to the insert pocket 104 by the clamp member 107. In other words, with the tip portion of the clamp member 107 being inserted in the through hole of the insert 1, the screw 105 may be inserted in the through hole of the clamp member 107. Then, the tip of the screw 105 may be inserted in a screw hole (not illustrated) formed in the holder 103, and screw portions are engaged with each other. In this way, the tip portion of the clamp member 107 presses the insert 1 against the holder 103. As a result, the insert 1 is mounted to the holder 103.

In a non-limiting aspect of the present disclosure, a sheet member 106 may be disposed between the insert pocket 104 and the insert 1. In this way, a possibility that the insert 1 is damaged and the like can be reduced. Note that, various shapes may be used for the sheet member 106.

The cutting tool 101 in a non-limiting aspect of the present disclosure includes the insert 1 including the above-described characteristic configuration, and thus a chip can be discharged smoothly also in so-called deep cutting processing in which a great amount of cutting is implemented. As a result, an improvement in machined surface accuracy is achieved. Further, an improvement in tool life may be also achieved.

Method for Manufacturing Machined Product

Next, a description will be given of a method for manufacturing a machined product according to a non-limiting aspect of the present disclosure using the drawings.

Figure 19:
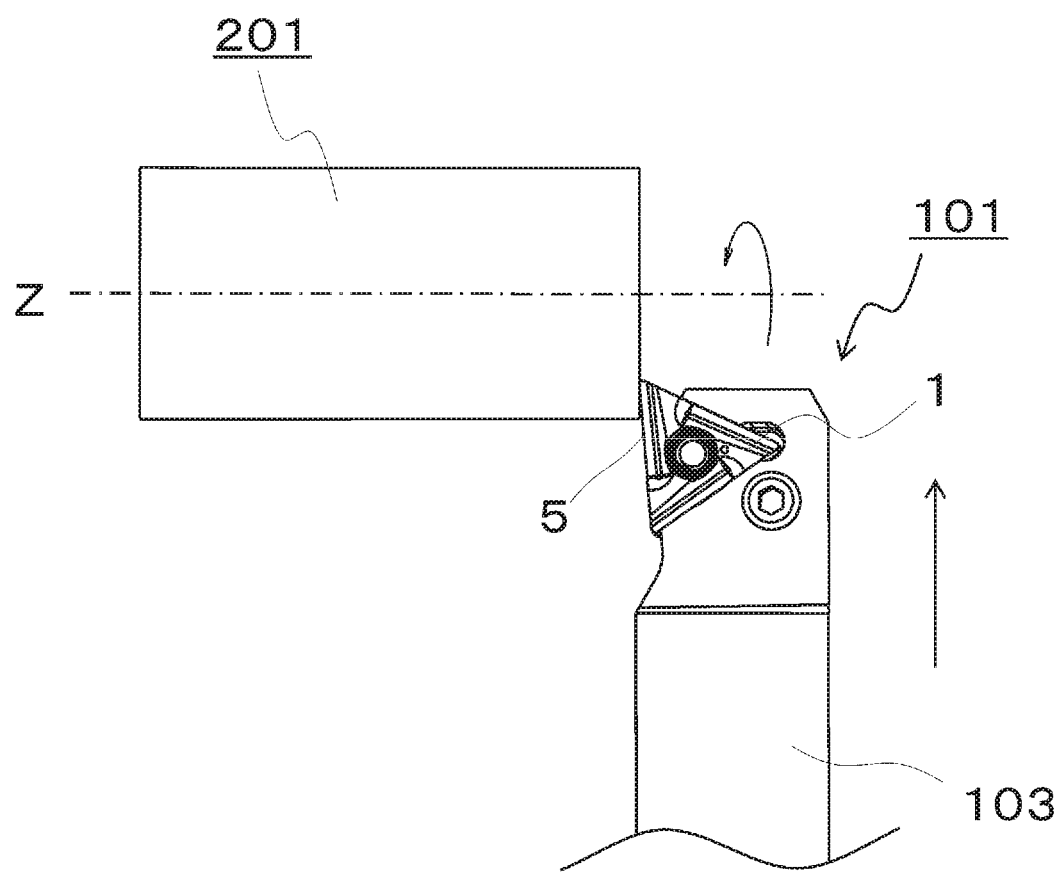
FIG. 19 is a schematic view illustrating one step in a method for manufacturing a machined product.
Figure 20:
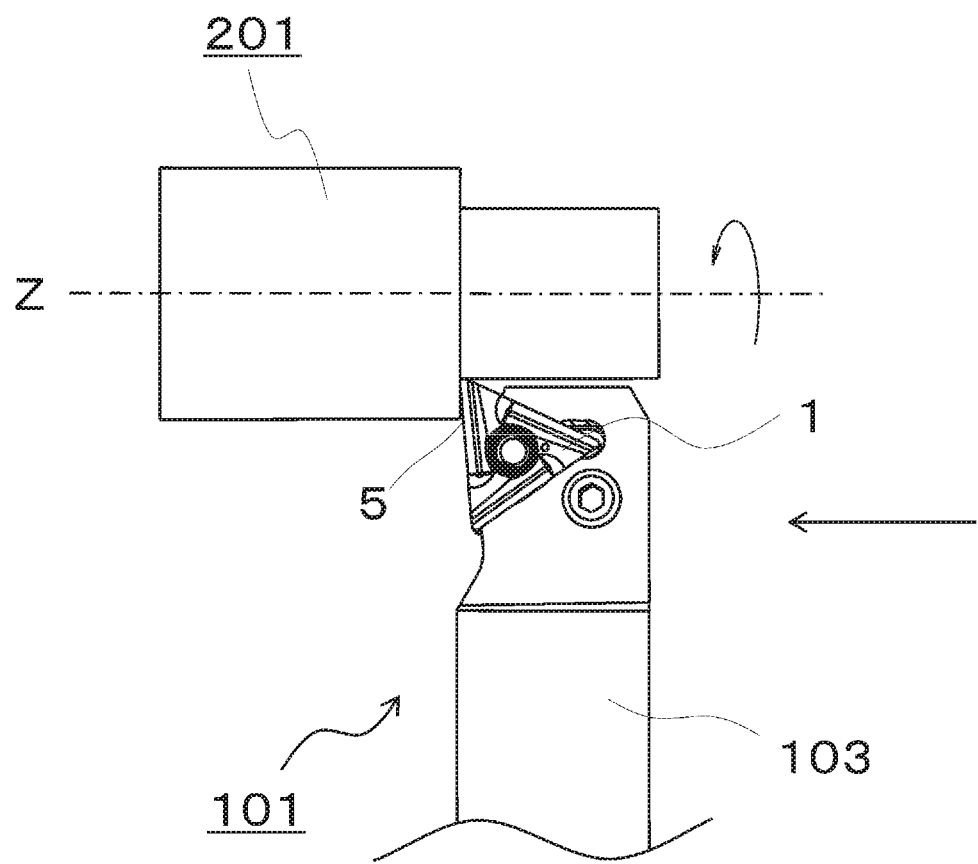
FIG. 20 is a schematic view illustrating one step in the method for manufacturing a machined product.
Figure 21:
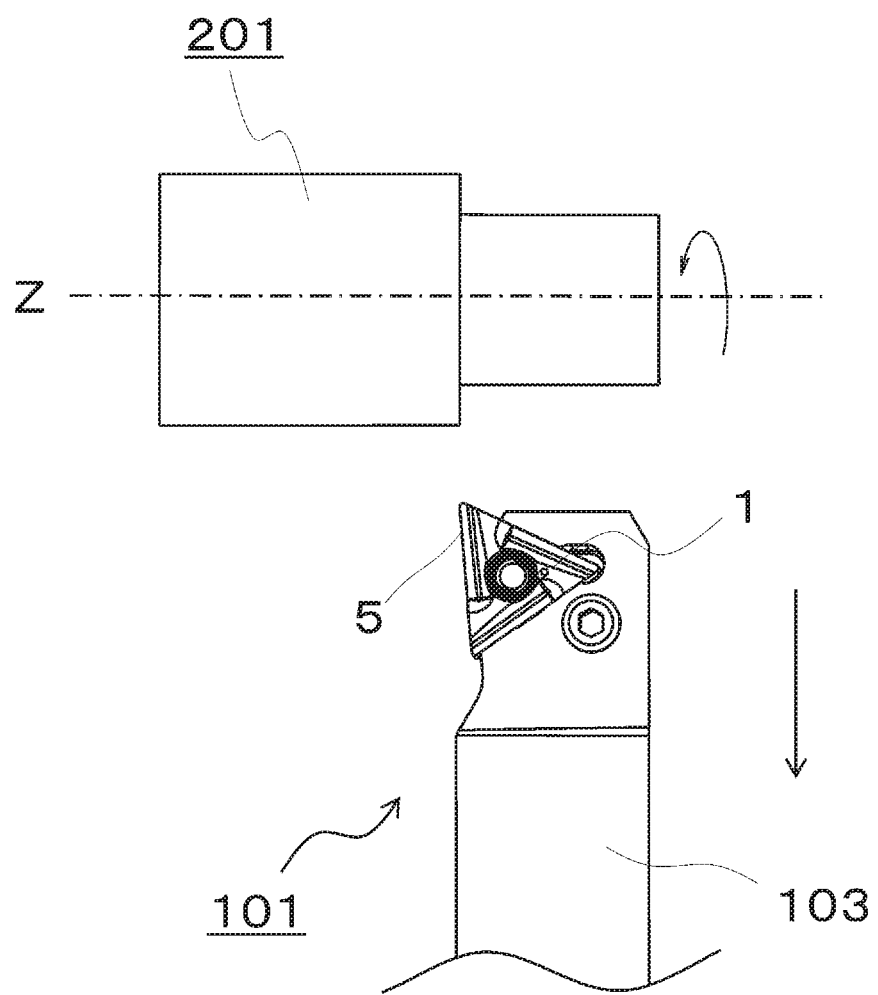
FIG. 21 is a schematic view illustrating one step in the method for manufacturing a machined product.

The manufacturing method in a non-limiting aspect of the present disclosure includes the following steps. Specifically, the method includes the steps of:

(1) relatively bringing a cutting tool 101 exemplified by the above-described non-limiting embodiments close to a workpiece 201 in a state where the workpiece 201 is rotated, as illustrated in FIG. 19;

(2) bringing a cutting edge 5 of the cutting tool 101 into contact with the workpiece 201 that is rotating, as illustrated in FIG. 20; and (3) separating the cutting tool 101 from the workpiece 201, as illustrated in FIG. 21.

The cutting tool 101 in the method for manufacturing a machined product in a non-limiting aspect of the present disclosure includes the insert 1 including the above-described characteristic configuration, and thus exhibits excellent cutting performance also in so-called deep cutting processing in which a great amount of cutting is implemented. As a result, an improvement in machined surface accuracy of a machined product is achieved, and an improvement in manufacturing efficiency is also achieved.

Note that, FIG. 19 illustrates a state where a rotation axis Z of a workpiece is fixed, a workpiece 201 is rotated, and the cutting tool 101 is being brought close. Furthermore, FIG. 20 illustrates a state where the cutting tool 101 is brought into contact with the workpiece 201 and cut processing is performed while the workpiece 201 is rotating. FIG. 21 illustrates a state where the workpiece 201 is rotated with the rotation axis Z being fixed, and the cutting tool 101 is moved away from the workpiece 201. Note that, in a non-limiting aspect of the present disclosure, in each of these steps, the workpiece 201 is rotated with the rotation axis Z being fixed and at the same time the cutting tool 101 is moved, but a non-limiting aspect of the present disclosure is not limited to such a configuration.

For example, in step (1), the workpiece 201 may be brought close to the cutting tool 101. Similarly, in step (3), the workpiece 201 may be moved away from the cutting tool 101. In a case where cut processing is to be continued, a step of bringing the cutting edge 5 of the cutting insert 1 into contact with different places on the workpiece 201 may be repeated by maintaining the state of rotating the workpiece 201. When the cutting edge 5 being used is worn, an unused cutting edge 5 may be used by rotating the insert 1 180 degrees with respect to the central axis S1.

Here, examples of the material of the workpiece 201 include carbon steel, alloy steel, stainless steel, cast iron, non-ferrous metals, or the like.

Non-limiting aspects of the present disclosure are described above. However, the present disclosure is not limited to the above non-limiting embodiments or non-limiting aspects, and naturally includes various modifications within a scope that does not deviate from the gist of the present disclosure.

In the whole of the present disclosure, objects in singular forms with "a", "an", and "the" also include a plurality of objects unless described otherwise clearly from the context.

REFERENCE SIGNS LIST

1 Cutting insert (insert)
2 Upper surface
21 First side portion
22 Second side portion
23 First corner portion
3 Lower surface
4 Side surface
5 Cutting edge
6 Through hole
7 First breaker portion
7a First end portion
7b Second end portion
71 First surface
72 Second surface
73 Recessed curved surface
8 Second region (mounting portion)
9 Second breaker portion
9a Third end portion
9b Fourth end portion
91 First portion
92 Second portion
11 First region
11a Fifth end portion
11b Sixth end portion
13 Fillet surface
101 Cutting tool
103 Holder
1031 Tip surface
1032 Upper surface
1033 Side surface
105 Screw
106 Sheet member
107 Clamp member
201 Workpiece

What is claimed is:

1. A cutting insert comprising:
an upper surface comprising:
    a first side portion;
    a second side portion; and
    a first corner portion located between the first side portion and the second side portion;
a lower surface located opposite to the upper surface;
a side surface located between the upper surface and the lower surface; and
a cutting edge located at an intersection of the upper surface and the side surface,
wherein
    the upper surface further comprises:
        a first breaker portion located along the first side portion and the first corner portion, and comprising a first end portion located on the first corner portion and a second end portion located farther from the first corner portion than the first end portion; and
        a second breaker portion located along the first side portion and connected to the second end portion;
    the first breaker portion further comprises:
        a first surface that is located along the first side portion and is inclined downward as the first surface extends away from the first side portion; and
        a second surface that is located along the first surface and is inclined upward as the second surface extends away from the first surface;
    the second breaker portion is inclined upward as the second breaker portion extends away from the first breaker portion;
    an inclination angle of the first surface is constant along the first side portion;
    a length of the first surface at the first end portion in a direction perpendicular to the first side portion is a first length and a length of the first surface at the second end portion in a direction perpendicular to the first side portion is a second length in a top view;
    the second length is greater than the first length;
    an intersection portion of the second end portion and the second breaker portion is orthogonal to the first side portion, or inclined away from the first corner portion as the intersection portion extends away from the first side portion in the top view; and
    a through hole extending from the upper surface toward the lower surface,
    wherein
        a straight line that passes through a center of the through hole and is perpendicular to the first side portion is a first straight line, the intersection portion of the second end portion and the second breaker portion is located farther from the first corner portion than the first straight line in the top view.

2. The cutting insert according to claim 1, wherein a length of the first surface in a direction perpendicular to the first side portion increases at a constant ratio with an increase in distance from the first corner portion in the top view.

3. The cutting insert according to claim 1, wherein
an inclination angle of the second surface is constant along the first side portion;
a length of the second surface at the first end portion in a direction perpendicular to the first side portion is a third length and a length of the second surface at the second end portion in a direction perpendicular to the first side portion is a fourth length in the top view; and
the fourth length is greater than the third length.

4. The cutting insert according to claim 1, wherein
a length of the second surface in a direction perpendicular to the first side portion increases at a constant ratio with an increase in distance from the first corner portion in the top view.

5. The cutting insert according to claim 1, wherein
the second breaker portion is one curved surface.

6. The cutting insert according to claim 1, wherein
the second breaker portion comprises:
    a third end portion located on the first side portion; and
    a fourth end portion located inward of the third end portion; and
a length of the second breaker portion at the third end portion in a direction along the first side portion is a fifth length and a length of the second breaker portion at the fourth end portion in a direction along the first side portion is a sixth length in the top view
the sixth length is greater than the fifth length.

7. The cutting insert according to claim 6, wherein
an outer edge of the second breaker portion has an arc shape in the top view.

8. The cutting insert according to claim 6, wherein
the second breaker portion further comprises:
    a first portion located on a side of the third end portion; and
    a second portion located on a side of the fourth end portion;
a length of the first portion in the direction along the first side portion increases gradually going inward in the top view, and
a length of the second portion in the direction along the first side portion reduces gradually going inward in the top view.

9. The cutting insert according to claim 1, wherein
the cutting edge comprises a first cutting edge located at an intersection of the first surface and the side surface and further located at the first side portion and along the first breaker portion; and
the first cutting edge is inclined downward as going away from the first corner portion.

10. The cutting insert according to claim 1, wherein
the upper surface further comprises:
    a first region that connects the first breaker portion to the through hole; and
    a second region that is connected to the second breaker portion and extends along the first side portion;
wherein
    the first region is closer to the lower surface than the second region; and
    the second region is a flat surface perpendicular to a central axis of the through hole.

11. The cutting insert according to claim 10, wherein
the first region comprises a fifth end portion and a sixth end portion located farther from the first corner portion than the fifth end portion; and
a distance between the first side portion and the sixth end portion is greater than a distance between the first side portion and the fifth end portion in the top view.

12. The cutting insert according to claim 10, wherein
the first region has a recessed shape in a side view.

13. The cutting insert according to claim 10, wherein
the first region is a protruding curved surface in a cross-section perpendicular to the first side portion.

14. A cutting tool comprising:
the cutting insert according to claim 1; and
a holder on which the cutting insert is mounted.

15. A method for manufacturing a machined product, comprising:
rotating a workpiece;
bringing the cutting edge of the cutting tool according to claim 14 into contact with the workpiece that is rotating; and
separating the cutting tool from the workpiece.

16. A cutting insert comprising:
an upper surface comprising:
    a first side portion;
    a second side portion; and
    a first corner portion located between the first side portion and the second side portion;
a lower surface located opposite to the upper surface;
a side surface located between the upper surface and the lower surface; and
a cutting edge located at an intersection of the upper surface and the side surface,
wherein
    the upper surface further comprises:
        a first breaker portion located along the first side portion and the first corner portion, and comprising a first end portion located on the first corner portion and a second end portion located farther from the first corner portion than the first end portion; and
        a second breaker portion located along the first side portion and connected to the second end portion;
    the first breaker portion further comprises:
        a first surface that is located along the first side portion and is inclined downward as the first surface extends away from the first side portion; and
        a second surface that is located along the first surface and is inclined upward as the second surface extends away from the first surface;
    the second breaker portion is inclined upward as the second breaker portion extends away from the first breaker portion;
    an inclination angle of the first surface is constant along the first side portion;
    a length of the first surface at the first end portion in a direction perpendicular to the first side portion is a first length and a length of the first surface at the second end portion in a direction perpendicular to the first side portion is a second length in a top view;
    the second length is greater than the first length;
    an intersection portion of the second end portion and the second breaker portion is orthogonal to the first side portion, or inclined away from the first corner portion as the intersection portion extends away from the first side portion in the top view;
    the cutting edge comprises a first cutting edge located at an intersection of the first surface and the side surface and further located at the first side portion and along the first breaker portion; and the first cutting edge is inclined downward as going away from the first corner portion.

\* \* \* \* \*